(12) United States Patent
Zhang et al.

(10) Patent No.: US 11,728,959 B2
(45) Date of Patent: Aug. 15, 2023

(54) METHOD AND APPARATUS FOR MANAGING MIXED TRANSMISSION

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Somerset, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 17/112,878

(22) Filed: Dec. 4, 2020

(65) Prior Publication Data

US 2022/0182211 A1    Jun. 9, 2022

(51) Int. Cl.
  *H04L 5/14*  (2006.01)
  *H04L 5/00*  (2006.01)
  *H04W 74/08*  (2009.01)
  *H04W 72/23*  (2023.01)
  *H04W 72/566*  (2023.01)

(52) U.S. Cl.
  CPC .............. *H04L 5/14* (2013.01); *H04L 5/0048* (2013.01); *H04W 72/23* (2023.01); *H04W 72/566* (2023.01); *H04W 74/0833* (2013.01)

(58) Field of Classification Search
  CPC .... H04L 5/14; H04L 5/0048; H04W 71/1247; H04W 72/1289; H04W 74/0833
  See application file for complete search history.

(56) References Cited

U.S. PATENT DOCUMENTS

| 8,811,240 B2 * | 8/2014 | Chindapol ............ H04L 5/0091 370/329 |
| 2004/0003296 A1 * | 1/2004 | Robert .................... H04L 12/12 713/300 |

(Continued)

FOREIGN PATENT DOCUMENTS

| CN | 109842869 A * | 6/2019 | ............... H04L 1/08 |
| EP | 2919411 A1 * | 9/2015 | ............... H04L 5/14 |

(Continued)

OTHER PUBLICATIONS

International Search Report and Written Opinion—PCT/US2021/061664—ISA/EPO—dated Mar. 25, 2022.

*Primary Examiner* — Jay P Patel
(74) *Attorney, Agent, or Firm* — Procopio, Cory, Hargreaves & Savitch LLP

(57) ABSTRACT

A UE may receive, from a base station, scheduling information for a first DL transmission associated with half-duplex mode and a second DL transmission associated with full duplex mode, determine priorities of the first and second DL transmissions, and monitoring for a higher priority DL transmission among the first and second DL transmissions. The UE may transmit a first UL transmission associated with a half-duplex mode and a second UL transmission associated with a full duplex mode, and the base station may determine priorities of the first and second UL transmissions. The priority may be determined by the duplex mode or the content of the first and second DL transmissions and the first and second UL transmissions.

28 Claims, 12 Drawing Sheets

(56) References Cited

U.S. PATENT DOCUMENTS

| | | | |
|---|---|---|---|
| 2009/0092066 A1* | 4/2009 | Chindapol | H04W 72/005 370/277 |
| 2009/0092067 A1* | 4/2009 | Sudarshan | H04B 7/2656 370/336 |
| 2009/0219841 A1* | 9/2009 | Sudarshan | H04L 5/14 370/281 |
| 2010/0142418 A1 | 6/2010 | Nishioka et al. | |
| 2010/0255826 A1* | 10/2010 | Brewer | H04W 76/45 455/518 |
| 2015/0009865 A1* | 1/2015 | Sharma | H04W 4/10 370/277 |
| 2015/0049624 A1* | 2/2015 | Sun | H04L 5/14 370/252 |
| 2018/0034736 A1* | 2/2018 | Anchan | H04L 47/2433 |
| 2018/0084548 A1* | 3/2018 | Min | H04W 72/082 |
| 2018/0242317 A1* | 8/2018 | Marinier | H04W 72/0453 |
| 2018/0332579 A1* | 11/2018 | Kang | H04W 72/566 |
| 2020/0154450 A1 | 5/2020 | Zhou et al. | |
| 2021/0028916 A1* | 1/2021 | Huang | H04L 5/14 |
| 2021/0203469 A1* | 7/2021 | Abedini | H04L 5/0064 |
| 2022/0191858 A1* | 6/2022 | Cui | H04L 5/0042 |

FOREIGN PATENT DOCUMENTS

| | | | | |
|---|---|---|---|---|
| EP | 3258620 A1 | | 12/2017 | |
| WO | WO-2011119579 A1 | * | 9/2011 | H04W 76/005 |
| WO | WO-2013131438 A1 | * | 9/2013 | H04L 5/0053 |
| WO | WO-2016029361 A1 | * | 3/2016 | H04B 7/2615 |
| WO | WO-2016029364 A1 | * | 3/2016 | H04L 5/14 |
| WO | WO-2016048610 A1 | * | 3/2016 | H04L 5/14 |
| WO | WO-2020198416 A1 | * | 10/2020 | H04L 5/001 |
| WO | WO-2020223448 A1 | * | 11/2020 | H04L 5/0053 |
| WO | 2020237650 A1 | | 12/2020 | |
| WO | WO-2021021892 A1 | * | 2/2021 | H04W 72/1242 |
| WO | WO-2021067529 A1 | * | 4/2021 | |

* cited by examiner

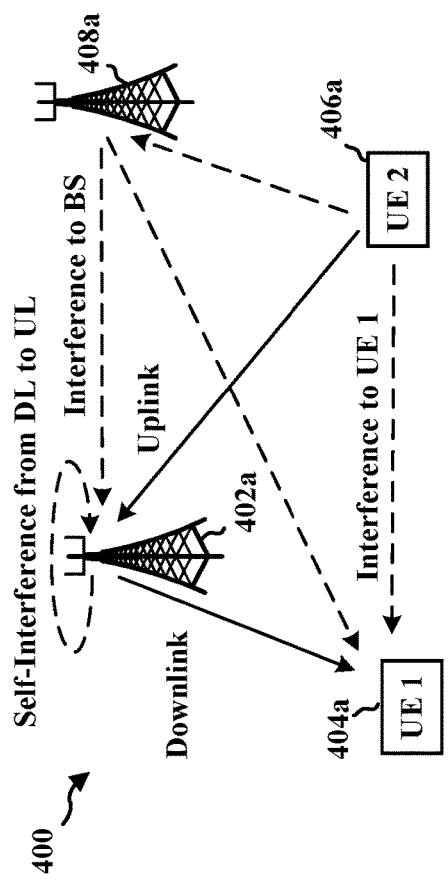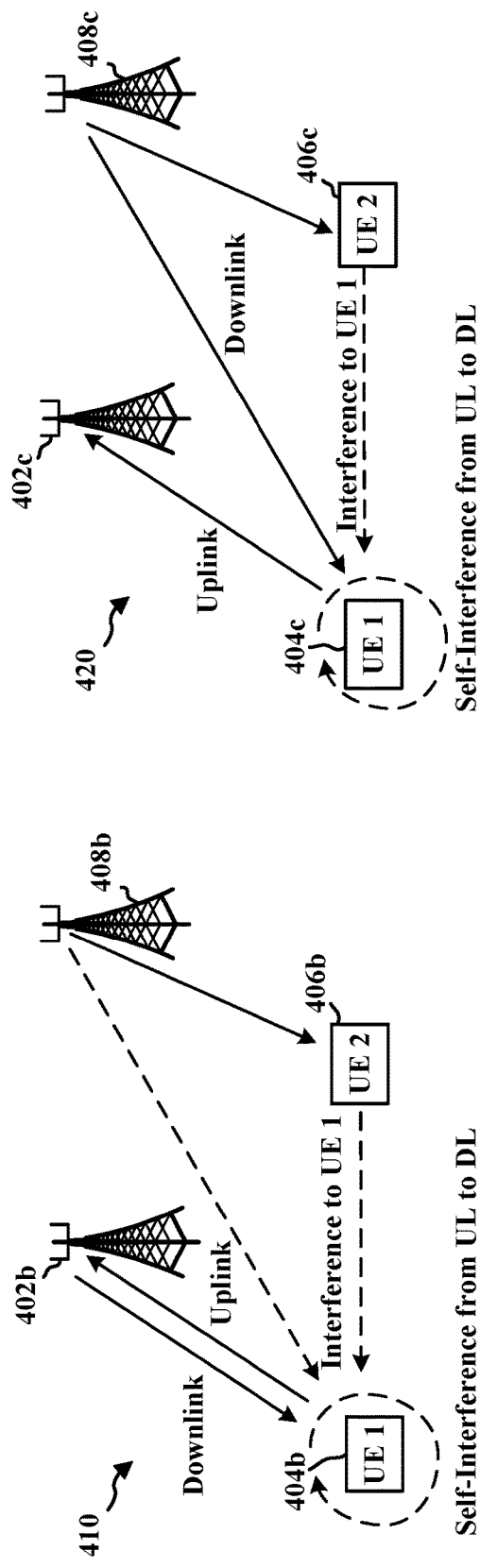
FIG. 4A
FIG. 4B
FIG. 4C

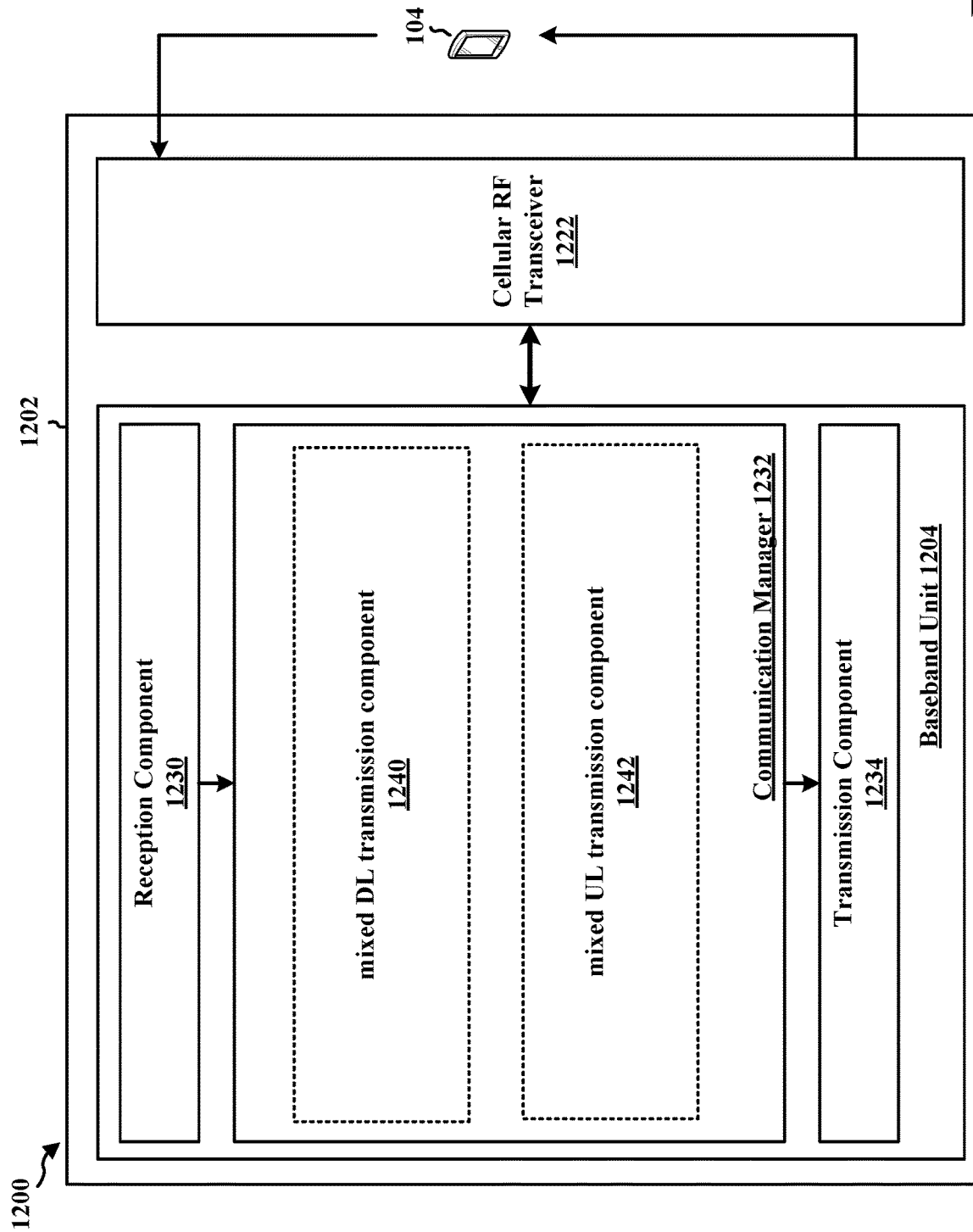

METHOD AND APPARATUS FOR MANAGING MIXED TRANSMISSION

BACKGROUND

Technical Field

The present disclosure generally relates to communication systems, and more particularly, to a method and apparatus for managing mixed transmission in a half-duplex and/or a full duplex mode.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) to receive, from a base station, scheduling information for a first downlink (DL) transmission associated with half-duplex mode and a second DL transmission associated with full duplex mode, determine priorities of the first DL transmission and the second DL transmission, and monitor for a higher priority DL transmission among the first DL transmission and the second DL transmission. The priorities of the first DL transmission and the second DL transmission is determined based on duplex modes of the first transmission group and the second transmission group. The UE may prioritize a search for the first DL transmission of the first transmission group associated with the half-duplex mode over the search for the second DL transmission of the second transmission group associated with the full duplex mode. The UE may determine a duplex mode of the first DL transmission and the DL second transmission implicitly or explicitly.

The UE may prioritize a search for the second DL transmission of the second transmission group associated with the full duplex mode over the search for the first DL transmission of the first transmission group associated with the half-duplex mode. The priorities of the first DL transmission and the second transmission may be determined based on content of the first DL transmission and the second DL transmission, the contents including one of a control resource set (CORESET) for a physical downlink control channel (PDCCH), a channel status information (CSI) reference transmission (RS) (CSI-RS), a physical downlink shared channel (PDSCH), or a synchronization transmission block (SSB).

The first DL transmission and the second DL transmission may be scheduled for transmission in different component carriers. The first DL transmission and the second DL transmission may also be scheduled for transmission in a same component carrier. The first DL transmission and the second DL transmission may be received on two different antenna panels.

A base station may schedule the UE for a first UL transmission included in a first UL transmission group associated with a half-duplex mode and a second UL transmission included in a second UL transmission group associated with a full-duplex mode, determine a higher priority UL transmission between a first UL transmission associated with a half-duplex mode and a second UL transmission associated with a full-duplex mode, and monitor for the first UL transmission and the second UL transmission using a beam of the higher priority UL transmission.

The priorities of the first UL transmission and the second UL transmission may be determined based on duplex modes of the first transmission group and the second transmission group. The priorities of the first UL transmission and the second transmission may be determined further based on content of the first UL transmission and the second UL transmission, the contents including one of a physical uplink control channel (PUCCH), a sounding reference transmission (SRS), a physical uplink shared channel (PUSCH), or a physical random access channel (PRACH).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A, 4B, and 4C illustrate example diagrams of full duplex wireless communication.

FIG. 12 is a diagram illustrating an example of a hardware implementation for an example apparatus.

DETAILED DESCRIPTION

Figure 1:
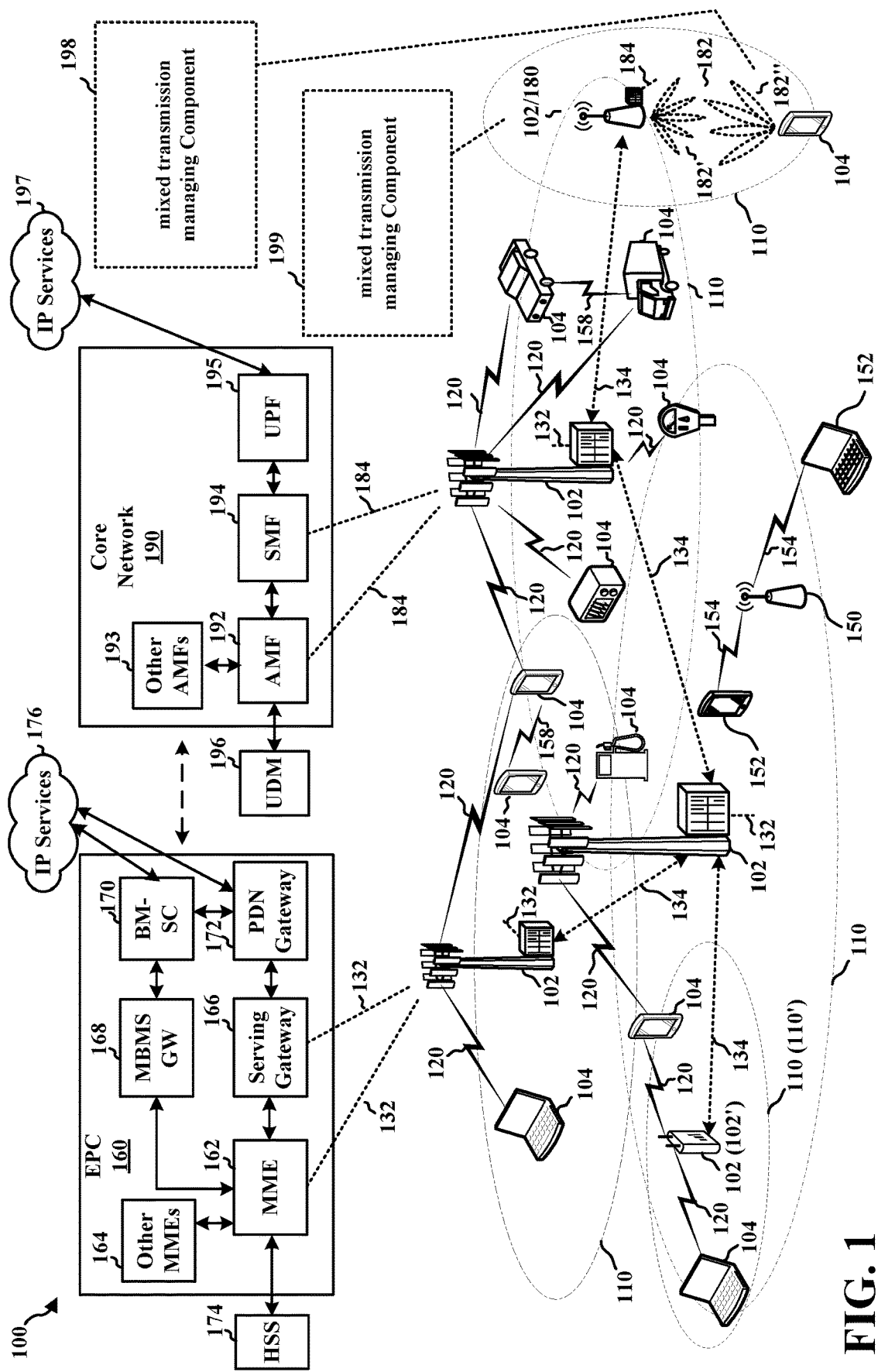
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A user equipment (UE) and/or a base station may communicate in a full duplex mode in which uplink communication and downlink communication is exchanged in the same frequency band, or partially overlapped frequency band, or separate frequency bands at overlapping times, as well as in a half-duplex mode. The UE and the base station may exchange communication using one or more directional beams, and the uplink communication and/or the downlink communication may include a combination of transmissions. The base station and the UE may manage the combination of mixed transmissions. A UE may receive a configuration or scheduling for a mixture of half-duplex signals and full-duplex signals, or for a mixture of half-duplex signals, or for a mixture of full-duplex signals. For example, there may be a mixture of half-duplex and full-duplex control signals, data signals, reference signals, etc. The mixed signals may be downlink signals and/or uplink signals. Aspects presented herein enable a UE to prioritize among signals of different duplex modes (e.g., half-duplex or full-duplex).

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a mixed transmission managing component 198 configured to manage to transmit and receive mixed transmission with the base station. In certain aspects, the base station 180 may include a mixed transmission managing component 199 configured to manage to transmit and receive mixed transmission with the base station. Although the following description may be focused on 5G NR, the concepts described herein may be applicable to other similar areas, such as LTE, LTE-A, CDMA, GSM, and other wireless technologies.

Figure 2:
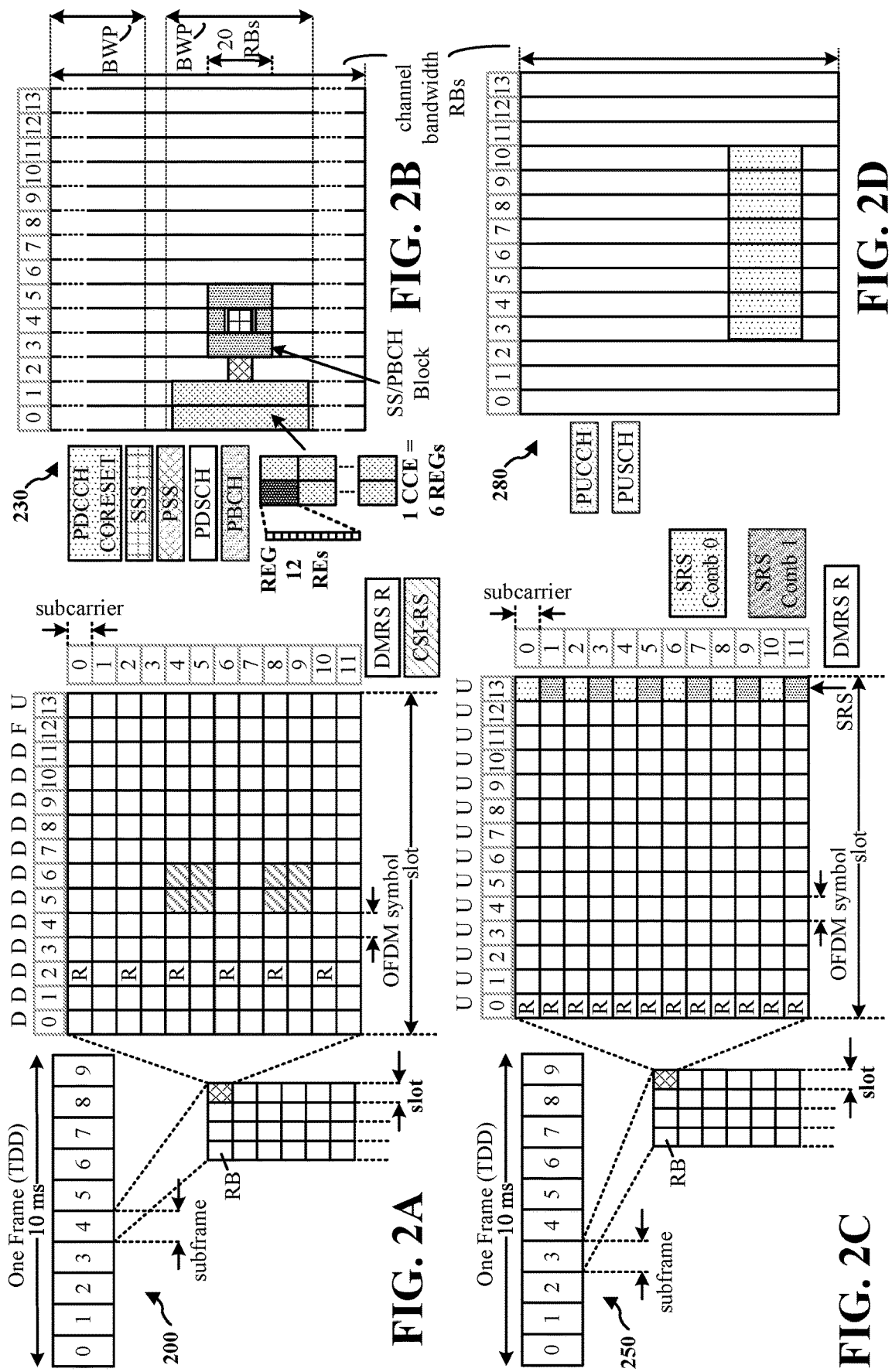
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
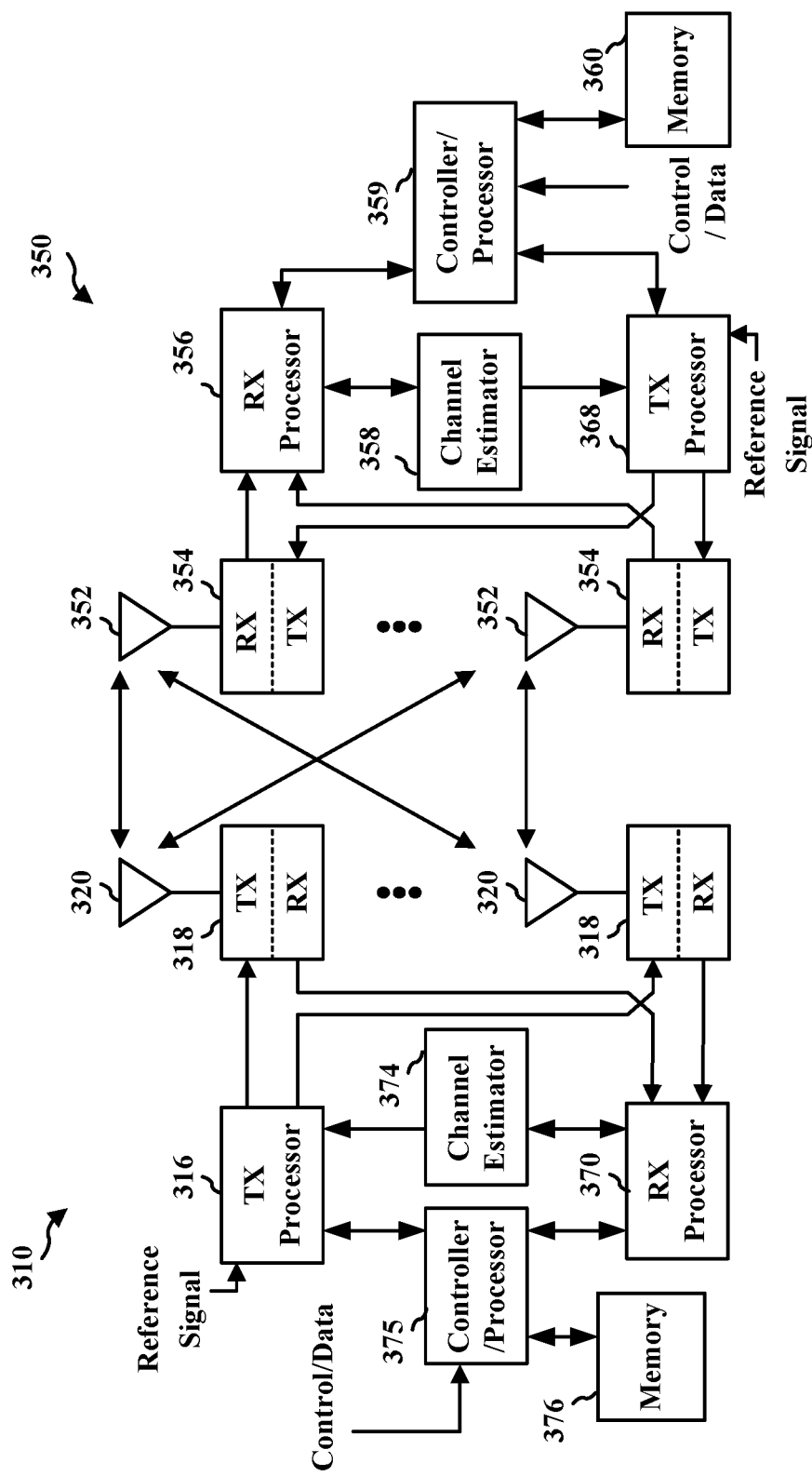
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

Wireless communication systems may be configured to share available system resources and provide various telecommunication services (e.g., telephony, video, data, messaging, broadcasts, etc.) based on multiple-access technologies that support communication with multiple users. Full duplex operation in which a wireless device exchanges uplink and downlink communication that overlaps in time may enable more efficient use of the wireless spectrum. Full duplex operation may include simultaneous transmission and reception in a same frequency range. In some examples, the frequency range may be a mmW frequency range, e.g., frequency range 2 (FR2). In some examples, the frequency range may be a sub-6 GHz frequency range, e.g., frequency range 1 (FR1). The aspects presented herein may also be applied to other frequency ranges. Full duplex capability may be supported at a base station and/or a UE. For example, a UE may transmit uplink communication from one antenna panel and may receive downlink communication with another antenna panel. In some examples, the full duplex communication may be conditional on beam separation or other conditions.

Full duplex communication may reduce latency. For example, full duplex operation may enable a UE to receive a downlink signal in an uplink only slot, which can reduce the latency for the downlink communication. Full duplex communication may improve spectrum efficiency, e.g., spectrum efficiency per cell or per UE. Full duplex communication may enable more efficient use of wireless resources.

FIGS. 4A-4C illustrate various modes of full duplex communication. Full duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full duplex communication 400 in which a first base station 402a is in full duplex communication with a first UE 404a and a second UE 406a. The first base station 402a is a full duplex base station, whereas the first UE 404a and the second UE 406a may be configured as either a half-duplex UE or a full duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a receiving some of the downlink signal being transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full duplex communication 410 in which a first base station 402b is in full duplex communication with a first UE 404b. In this example, the first base station 402b is a full duplex base station and the first UE 404b is a full duplex UE. The first base station 402b and the UE 404b that can concurrently receive and transmit communication that overlaps in time in a same frequency band. The base station and the UE may each experience self-interference, in which a transmitted signal from the device is leaked to a receiver at the same device. The first UE 404b may experience additional interference based on one or more signals emitted from a second UE 406b and/or a second base station 408b in proximity to the first UE 404b.

FIG. 4C shows a third example of full duplex communication 420 in which a first UE 404c is a full duplex UE in communication with a first base station 402c and a second base station 408c. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to, e.g., be received by, the UE's receiver. The first UE 404c may experience additional interference from the second UE 406c.

Figure 5:
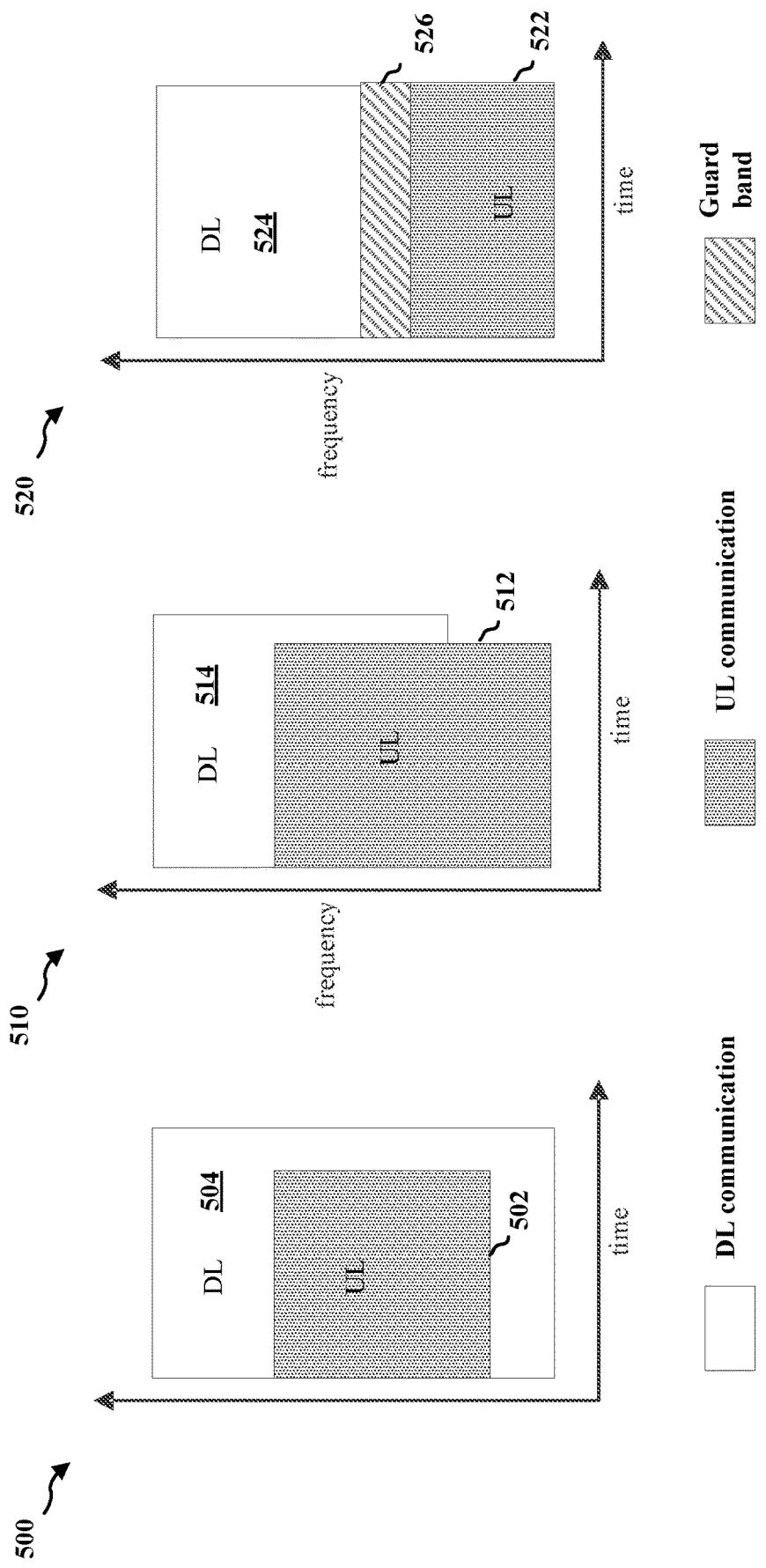
FIG. 5 illustrates examples of in-band full duplex (IBFD) resources and sub-band frequency division duplex (FDD) resources for full duplex communication.

Full duplex communication may be in a same frequency band. The uplink and downlink communication may be in different frequency subbands, in the same frequency subband, or in partially overlapping frequency subbands. FIG. 5 illustrates a first example 500 and a second example 510 of in-band full duplex (IBFD) resources and a third example 520 of sub-band full-duplex resources. In IBFD, signals may be transmitted and received in overlapping times and overlapping in frequency. As shown in the first example 500, a time and a frequency allocation of a UL resources 502 may fully overlap with a time and a frequency allocation of DL resources 504. In the second example 510, a time and a frequency allocation of UL resources 512 may partially overlap with a time and a frequency of allocation of DL resources 514.

IBFD is in contrast to sub-band frequency division duplex (FDD), where uplink and downlink resources may overlap in time using different frequencies, as shown in the third example 520. In the third example 520, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. UL resources and a DL resources that are immediately adjacent to each other correspond to a guard band width of 0. As an output signal, e.g., from a UE transmitter may extends outside the UL resources, the guard band may reduce interference experienced by the UE. Sub-band FDD may also be referred to as "flexible duplex."

In some aspects, the UE and the base station may be scheduled to transmit and/or receive signals based on different duplex modes. For example, the UE may be scheduled to receive control signals, data signals, and/or reference signals that include a mixture of half-duplex (HD) signals and full duplex (FD) signals. For example, the UE may be scheduled to receive, or monitor for, multiple overlapping downlink transmissions including more than one of the control signal, the data signal, or the RS signal. At least one signal may be scheduled for the HD mode and at least one overlapping signal may be scheduled the FD mode, e.g., for simultaneous uplink (UL) and/or downlink (DL) transmissions between the UE and the base station. The base station may transmit scheduling information for the DL transmission to the UE, and the DL transmission scheduled by the base station may include a combination of transmissions including more than one of the control signal, the data signal, or the RS signal via one of the HD mode or the FD mode. In some examples, the UE may be scheduled to transmit multiple overlapping uplink transmissions with at least one uplink transmission scheduled for half-duplex transmission and the other scheduled for full-duplex transmission. The base station may also schedule the UE to send the UL transmission to the base station, and the UL transmission may include a combination of transmissions including more than one of the control signal, the data signal, or the RS signal in one of the HD mode or the FD mode. In some examples, the mixed signals (e.g., half-duplex and full-duplex signals that are scheduled at overlapping times) may be uplink and downlink signals.

Aspects presented herein provide a priority rule for the UE and the base station to handle mixed HD and FD Control/Data/RS signals that overlap in time. In some aspects, the UE and the base station may use at least two groups for each of the UL or DL transmissions. That is, the UE and the base station may group the signals in a first group for HD signals associated with HD beams and a second group for FD signals associated with FD beam pairs. That is, the UE may receive scheduling information for a mixed DL transmission including one HD CORESET and one FD PDSCH, and the UE may determine that the first group includes the HD CORESET and the second group includes the FD PDSCH. The UE may receive the scheduling information for the HD CORESET separately from the scheduling information for the PDSCH. The UE may also receive scheduling information or a configuration for a mixed DL transmission including four CORESETs including CORESET1 and CORESET2 in HD mode, CORESET3 and CORESET4 in FD mode, and the UE may define that the first group includes the HD CORESET1 and CORESET2 and group 2 includes FD CORESETs 3 and 4. The UE may separately receive the scheduling information or configuration for the different CORESETS. Similarly, the groups may be for uplink signals with one group for half duplex transmissions scheduled for the UE and the other group for full-duplex transmissions scheduled for the UE. The UE and the base station may determine priorities of the UL or DL transmissions among the scheduled mixed signals. For example, the UE may use the relative priorities of the signals to prioritize monitoring for one DL signal of one duplex mode over a different DL signal of a different duplex mode. Similarly, the UE may use the relative priorities of the signals to prioritize transmission of one UL signal of one duplex mode over a different UL signal of a different duplex mode. The UE may prioritize the UL or DL transmission with a higher priority over the UL or DL transmission with a lower priority. The base station may similarly use the prioritization to prioritize transmission of downlink signals to the UE and/or to receive uplink transmissions from the UE.

In some aspects, the UE may group the transmission (whether DL or UL) based on duplex modes of the scheduled transmissions. For example, the UE may define a first group for HD DL transmissions and a second group for FD DL transmissions. In one aspect, the UE may determine that the first group for the HD DL transmissions has the higher priority and the second group for the FD DL transmissions has the lower priority. That is, the UE may determine to monitor the search space for the HD group signals first. For example, the UE may search for a search space (SS) based on the HD group before searching for an SS based on the FD group. Similarly, for uplink signals, the UE may prioritize transmission of a signal from the HD group over transmission of a signal from the FD group. In another aspect, the UE may determine that the first group for the HD DL transmissions has the lower priority and the second group for the FD DL transmissions has the higher priority. That is, the UE may determine to monitor the search space for the FD group signals first. For example, the UE may search for the SS based on the FD group before searching for an SS based on the HD group. Similarly, for uplink signals, the UE may prioritize transmission of a signal from the FD group over transmission of a signal from the HD group.

Thus, the UE and the base station may prioritize among mixed FD and HD signals based on a duplex mode of the signals. In some examples, HD signals may be prioritized over FD signals. In other examples, FD signals may be prioritized over HD signals.

In some aspect, the UE may prioritize signals based on the content of the signal. The prioritization based on content may be performed without considering the duplex mode. In some aspects, the prioritization may be based on content and a duplex mode. For example, the UE may be scheduled for reception of one or more of CORESET, CSI-RS, PDSCH, or SSB. In one aspect, the UE may prioritize reception of the CORESET of one duplex mode over reception of the CSI-RS, the PDSCH, or the SSB of the other duplex mode. In another aspect, the UE may prioritize the reception of the CSI-RS of one duplex mode over reception of the CORESET, the PDSCH, or the SSB of the other duplex mode. In another aspect, the UE may prioritize the reception of the PDSCH of one duplex mode over the reception CORESET, the CSI-RS, or the SSB of the other duplex mode. In yet another aspect, the UE may prioritize the SSB of one duplex mode over the PDSCH, the CORESET, or the CSI-RS of the other duplex mode.

In one example, the UE may receive scheduling information for DL transmissions from the base station including a HD CORESET and a FD PDSCH with resources that overlap in time. The UE may determine the priorities of the HD CORESET transmission and the FD PDSCH transmission based on the content of the respective DL transmissions. The UE may determine that the control signal has a higher priority, e.g., that the HD CORESET transmission has a higher priority because the HD CORESET is control signaling. The UE may monitor for the HD CORESET transmission in the scheduled search space for the PDCCH within the active DL transmission bandwidth. The UE may skip reception of the FD PDSCH or use the HD CORESET beam for reception of the FD PDSCH based on the prioritization of the HD CORESET in some examples. In other aspects, the UE may determine that the data transmission has a higher priority than the HD CORESET, e.g., that the reception of the FD PDSCH transmission has a higher priority than the HD CORESET based on the content of the PDSCH. The UE may monitor for the FD PDSCH transmission based on the scheduling information for the PDSCH. The UE may skip monitoring for the lower priority signal that overlaps in time with the FD PDSCH.

In another example, the UE may receive scheduling information, or a configuration, for DL reception of a HD SSB and a FD CORESET. The UE may determine the priorities of the HD SSB transmission and the FD CORESET transmission based on the content of the respective DL transmissions. The UE may determine that the reference signal transmission has a higher priority and determine that the HD SSB transmission has a higher priority. The UE may monitor for the HD SSB transmission. The UE may skip reception or use the HD SSB beam for reception of the FD CORESET that overlaps with the HD SSB. In other examples, the UE may determine that the control signal has a higher priority and determine that the FD CORESET transmission has a higher priority than the HD SSB. The UE may monitor for the FD CORESET transmission and may skip reception of the HD SSB.

Accordingly, the UE may prioritize among signals of different duplex modes based on any combination of duplex modes (e.g., based on duplex mode groups) and the contents of the scheduled transmissions.

In some aspects, the UE may be scheduling for overlapping DL/UL signals within the same duplex mode group. The UE may further apply a prioritization rule within the duplex mode group to determine which signal to monitor or transmit within each group. As one non-limiting example, if a UE is configured for single cell operation or for operation with carrier aggregation in a same frequency band, and the UE monitors PDCCH candidates in overlapping PDCCH monitoring occasions in multiple CORESETs that have same or different quasi co-location (QCL)-TypeD properties on active DL BWP(s) of one or more cells and associated with a same duplex mode, the UE may monitor PDCCHs only in a CORESET, and in any other CORESET from the multiple CORESETs having same QCL-TypeD properties as the CORESET, on the active DL BWP of a cell from the one or more cells. The CORESET that the UE monitors may correspond to the CSS set with the lowest index in the cell with the lowest index containing CSS, if any, and otherwise to the USS set with the lowest index in the cell with lowest index. The lowest USS set index may be determined over all USS sets with at least one PDCCH candidate in overlapping PDCCH monitoring occasions. For the purpose of determining the CORESET, a SS/PBCH block may be considered to have different QCL-TypeD properties than a CSI-RS.

In some aspects, the combinations of mixed DL signals of different duplex modes can be for the same carrier component (CC). In other aspects, the combinations of mixed DL signals of different duplex modes may be for different CCs, which may provide added flexibility or to improve the data throughput and reduce the latency. In one aspect, the UE may apply one or more priority rules to prioritize receiving the DL signal of one group of the mixed DL signals with the beam associated with the group. In one aspect, the UE may prioritize to receive the DL signal of one group of the mixed DL signals based on the duplex modes of the scheduled DL signals. In another aspect, the UE may prioritize to receive the DL signal of one group of the mixed DL signals based on the content of the scheduled DL signals.

In some aspects, the UE may prioritize one signal and yet may receive both groups of signals successfully. For example, the two groups of signals may be received on two different UE antenna panels. By receiving both of the signals in two groups, the UE may improve the data throughput and reduce the latency of the communication.

In some aspects, the combinations of the two DL signals may include various examples based on the combination of the transmission group definitions based on duplex modes and the contents of the scheduled DL transmissions. The UE may follow the rules to define a group with the priority per combination of the transmission group definitions based on duplex modes and the contents of the scheduled DL transmissions that may be applied.

In one example, the UE may prioritize the FD transmissions over HD transmissions and prioritize the CORESET over CSI-RS, CSI-RS over PDSCH, and PDSCH over SSB. For example, the priority rule based on content may be indicated as CORESET>CSI-RS>PDSCH>SSB.

In a first example, the UE may be scheduled to monitor a FD CORESET that overlaps with one or more of a HD CORESET, FD/HD CSI-RS, the FD/HD PDSCH, or the FD/HD SSB. In some aspects, the UE may prioritize a HD signal (e.g., the HD CORESET, HD CSI-RS, HD PDSCH, or HD SSB) over the FD CORESET based on a duplex mode grouping. In some aspects, the UE may prioritize the FD CORESET over a HD signal (e.g., the HD CORESET, HD CSI-RS, HD PDSCH, or HD SSB) based on a duplex mode grouping. In some aspects, the UE may prioritize control signaling (e.g., FD CORESET) over other content (e.g., over the HD/FD PDSCH, FD/HD CSI-RS, or FD/HD SSB. In other aspects, the UE may prioritize SSB over the control signaling, e.g., prioritizing FD/HD SSB reception over monitoring for the FD CORESET. Similarly, the UE may prioritize a different type of content, e.g., PDSCH or CSI-RS over the FD CORESET. If both signals are control signaling, e.g., overlapping FD CORESET and HD CORESET, the UE may prioritize among the control signals based on a duplex mode. Similarly, after prioritizing based on duplex type, the UE may prioritize among overlapping signals within the duplex type group based on content.

In a second example, the UE may be scheduled to monitor for HD CORESET that overlaps with one of the FD/HD CSI-RS, the FD/HD PDSCH, or the FD/HD SSB. In some aspects, the UE may prioritize a HD signal (e.g., the HD CORESET) over an FD signal (e.g., FD CSI-RS, FD PDSCH, FD SSB) based on a duplex mode grouping. In some aspects, the UE may prioritize a FD signal (e.g., FD CSI-RS, FD PDSCH, FD SSB) over the HD CORESET based on a duplex mode grouping. In some aspects, the UE may prioritize control signaling (e.g., HD CORESET) over other content (e.g., over the HD/FD PDSCH, FD/HD CSI-RS, or FD/HD SSB. In other aspects, the UE may prioritize SSB over the control signaling, e.g., prioritizing FD/HD SSB reception over monitoring for the HD CORESET. Similarly, the UE may prioritize a different type of content, e.g., PDSCH or CSI-RS over the HD CORESET. If both signals are control signaling, e.g., overlapping FD CORESET and HD CORESET, the UE may prioritize among the control signals based on a duplex mode. Similarly, after prioritizing based on duplex type, the UE may prioritize among overlapping signals within the duplex type group based on content.

In a third example, the UE may be scheduled to receive a FD CSI-RS that overlaps with one of the HD CSI-RS, the FD/HD PDSCH, or the FD/HD SSB. In some aspects, the UE may prioritize a HD signal (e.g., the HD CSI-RS, HD PDSCH, or HD SSB) over the FD CSI-RS based on a duplex mode grouping. In some aspects, the UE may prioritize the FD CSI-RS over a HD signal (e.g., the HD CSI-RS, HD PDSCH, or HD SSB) based on a duplex mode grouping. In some aspects, the UE may prioritize CSI-RS over other content (e.g., over the HD/FD PDSCH, or FD/HD SSB). In other aspects, the UE may prioritize SSB or PDSCH over the CSI-RS, e.g., prioritizing FD/HD SSB reception over monitoring for the FD CSI-RS. If both signals are CSI-RS, e.g., overlapping FD CSI-RS and HD CSI-RS, the UE may prioritize among the CSI-RS signals based on a duplex mode. Similarly, after prioritizing based on duplex type, the UE may prioritize among overlapping signals within the duplex type group based on content.

In a fourth example, the UE may be scheduled to receive a HD CSI-RS that overlaps with one of the FD/HD PDSCH, or the FD/HD SSB. In some aspects, the UE may prioritize a HD signal (e.g., the HD CSI-RS) over a FD signal (e.g., the FD CSI-RS, FD PDSCH, or FD SSB) based on a duplex mode grouping. In some aspects, the UE may prioritize the FD signal (e.g., the FD CSI-RS, FD PDSCH, or FD SSB) over a HD signal (e.g., the HD CSI-RS) based on a duplex mode grouping. In some aspects, the UE may prioritize CSI-RS over other content (e.g., over the HD/FD PDSCH, or FD/HD SSB). In other aspects, the UE may prioritize SSB or PDSCH over the CSI-RS, e.g., prioritizing FD/HD SSB reception over monitoring for the HD CSI-RS. If both signals are CSI-RS, e.g., overlapping FD CSI-RS and HD CSI-RS, the UE may prioritize among the CSI-RS signals based on a duplex mode. Similarly, after prioritizing based on duplex type, the UE may prioritize among overlapping signals within the duplex type group based on content.

In a fourth example, the UE may be scheduled to receive a FD PDSCH that overlaps with one of the HD PDSCH, the FD/HD SSB. In some aspects, the UE may prioritize a HD signal (e.g., the HD PDSCH or HD SSB) over the FD PDSCH based on a duplex mode grouping. In some aspects, the UE may prioritize the FD PDSCH over a HD signal (e.g., the HD PDSCH or HD SSB) based on a duplex mode grouping. In some aspects, the UE may prioritize PDSCH reception over other content (e.g., over the FD/HD SSB). In other aspects, the UE may prioritize SSB reception over the PDSCH, e.g., prioritizing FD/HD SSB reception over reception of the FD PDSCH. If both signals are PDSCH, e.g., overlapping FD PDSCH and HD PDSCH, the UE may prioritize among the CSI-RS signals based on a duplex mode. Similarly, after prioritizing based on duplex type, the UE may prioritize among overlapping signals within the duplex type group based on content.

The UE may be scheduled to receive HD PDSCH that overlaps with one of the FD/HD SSB. In some aspects, the UE may prioritize a HD signal (e.g., the HD PDSCH) over a FD signal (e.g., FD PDSCH or FD SSB) based on a duplex mode grouping. In some aspects, the UE may prioritize the FD signal (e.g., FD PDSCH or FD SSB) over a HD signal (e.g., the HD PDSCH or HD SSB) based on a duplex mode grouping. In some aspects, the UE may prioritize PDSCH reception over other content (e.g., over the FD/HD SSB). In other aspects, the UE may prioritize SSB reception over the PDSCH, e.g., prioritizing FD/HD SSB reception over reception of the HD PDSCH. If both signals are PDSCH, e.g., overlapping FD PDSCH and HD PDSCH, the UE may prioritize among the CSI-RS signals based on a duplex mode. Similarly, after prioritizing based on duplex type, the UE may prioritize among overlapping signals within the duplex type group based on content.

In some examples, FD SSB reception may overlap with HD SSB. In some examples, the UE may prioritize reception of the FD SSB over the HD SSB. In other examples, the UE may prioritize reception of the HD SSB over the FD SSB.

For example, the UE may prioritize the HD transmissions over FD transmissions and prioritize the CORESET over CSI-RS, CSI-RS over PDSCH, and PDSCH over SSB.

In order to prioritize among different signals, the UE may identify the duplex mode of the scheduled signals. For example, the UE may identify the duplex mode of DL HD/FD signals. In some aspects, the duplex mode of the DL transmission may be implicitly indicated in DL transmission configuration indication (TCI) state. That is, the UE may be configured with a number of candidate TCI states, and the base station may assign a subset of configured candidate TCI states via RRC signaling and may indicate a specific TCI state from the configured candidate TCI states. The TCI states may include information about a reference signal. By associating the DL transmissions with one TCI state, the base station may inform the UE the beamforming used for the DL transmission has the same spatial relation information as the reference signal (RS) associated with the associated TCI. Accordingly, the TCI state associated with the DL transmission may indicate a bi-directional RS pair, and the UE may implicitly identify that the duplex mode of the received DL transmission is a FD mode signal. The TCI state associated with the DL transmission may indicate a single directional RS, and the UE may implicitly identify that the duplex mode of the received DL transmission is a HD mode signal.

In some aspects, the duplex mode of the DL transmission may be explicitly indicated in the signal, in scheduling information for the signal, or in a configuration for the signal. That is, the configuration for the DL transmission may include one or more bit indicating the duplex mode of the received DL transmission. For example, the bit in the signal may have a value of 1 to indicate the FD mode and 0 to indicate the HD mode. For example, the one or more bit may be included in the RRC configuration for the signal to indicate the duplex mode of the CORESET transmission. For example, the one or more bit may be included in DCI scheduling or activating the signal to indicate the duplex mode of the PDSCH transmission. For example, the one or more bit may be included in the RRC configuration for a CSI-RS to indicate the duplex mode of the CSI-RS transmission. The one or more bit indicating the duplex mode of the DL transmission may be an additional bit added to the configuration of the respective DL transmissions or may be included an existing field within the configuration of the respective DL transmissions, such as a reserved bit within the configuration.

The UE may also identify the duplex mode of the SSB transmission. The duplex mode of the SSB may be implicitly indicated in the pattern or sequence of the SSB. That is, the UE may determine that the SSB transmission is a FD mode SSB when the pattern or sequence of the SSB is transmitted simultaneously with a UL transmission. The duplex mode of the SSB may also be explicitly indicated in the SSB signal configuration. That is, the SSB signal configuration may include one or more bit indicating the duplex mode of the SSB transmission.

In some aspects, the UE may have the capability to transmit simultaneous UL transmissions, and the base station may schedule the UE to transmit simultaneous UL transmissions. The simultaneous signals may be from transmitted from different UE panels, the UE may use different beams to transmit the UL transmissions. If the simultaneous uplink signals are transmitted from the same antenna panel, the UE may use a prioritization rule to determine a shared beam to use to transmit both UL signals. Accordingly, the base station may receive the two UL simultaneous signals from the same UE panel using a beam based on the prioritized rule. That is, the base station may follow a prioritization rule to determine which UL transmission has a higher priority and monitor for the transmissions using the beam of higher priority UL transmission. In other examples, the UE may use different beams on different panels for the two UL transmissions. That is, the UE may transmit two different UL transmissions using two different beams from different antenna panels.

In some aspects, the UE may transmit combinations of mixed UL signals (e.g., overlapping UL signals of different duplex modes such as half-duplex and full-duplex) in the same CC. In some aspects, the UE may transmit combinations of mixed UL signals (e.g., overlapping UL signals of different duplex modes such as half-duplex and full-duplex) in different CCs. The uplink transmissions on different CCs may provide added f flexibility and may improve throughput and reduce latency.

The base station may apply one or more priority rules to prioritize reception of a particular UL signal and/or to determine a beam to use in receiving the UL signal of the one group of the mixed UL signals with the beam associated with the group. In another aspect, the base station may receive both group signals successfully. For example, the two group signals may be received on two different base station antenna panels, and both of the signals in two groups may be successfully received by the base station, improving the data throughput and reducing the latency.

The priority rule may address various combinations of two UL signals, e.g., based on duplex modes and/or the contents of the scheduled UL transmissions. The priority rule may apply duplex mode type and/or content prioritization similar to the mixed DL examples. The UE and/or base station may follow the rules to determine a higher priority uplink transmission per combination based on duplex modes and/or the contents of the scheduled UL transmissions. The UE may use the priority rule to prioritize uplink transmission of one of the uplink signals. The UE may use the priority rule to determine a beam to use in transmitting both of the uplink transmissions. The base station may use the priority rule to prioritize reception of one of the uplink beams and/or to determine a beam that the UE will use to transmit both uplink transmissions.

In one example, FD transmissions may be prioritized over HD transmissions. In another example, PUCCH may be prioritized over the PUSCH, the PUSCH may be prioritized over the SRS, and the SRS may be prioritized over the PRACH. For example, the priority relationship based on content may be indicated as PUCCH>PUSCH>SRS>PRACH.

In a first example, the UE may be scheduled for an FD PUCCH transmission that overlaps with one of the HD PUCCH, the FD/HD PUSCH, the FD/HD SRS, or the FD/HD PRACH. In some aspects, the UE may prioritize a HD signal (e.g., the HD PUCCH, HD PUSCH, HD SRS, or HD PRACH) over the FD PUCCH based on a duplex mode grouping. In some aspects, the UE may prioritize the FD PUCCH over a HD signal (e.g., the HD PUCCH, HD PUSCH, HD SRS, or HD PRACH) based on a duplex mode grouping. In some aspects, the UE may prioritize control signaling (e.g., FD PUCCH) over other content (e.g., over the HD/FD PUSCH, FD/HD SRS, or FD/HD PRACH). In other aspects, the UE may prioritize a different type of content over the control signaling, e.g., prioritizing FD/HD PUSCH, SRS, or PRACH over transmission of the FD PUCCH. If both signals are control signaling, e.g., overlapping FD PUCCH and HD PUCCH, the UE may prioritize among the control signals based on a duplex mode. Similarly, after prioritizing based on duplex type, the UE may prioritize among overlapping signals within the duplex type group based on content. The UE may use the beam of the higher priority UL signal to transmit both UL signals from a same antenna panel. The base station may prioritize reception of the higher priority UL signal and/or may use the priority rule to determine the beam that the UE will use to transmit both UL signals.

In a second example, the UE may be scheduled for an HD PUCCH transmission that overlaps, with one of the FD/HD PUSCH, the FD/HD SRS, or the FD/HD PRACH. In some aspects, the UE may prioritize a HD signal (e.g., the HD PUCCH) over an FD signal (e.g., the FD PUCCH, FD PUSCH, FD SRS, or FD PRACH) based on a duplex mode grouping. In some aspects, the UE may prioritize the FD signal (e.g., the FD PUCCH, FD PUSCH, FD SRS, or FD PRACH) over the HD PUCCH based on a duplex mode grouping. In some aspects, the UE may prioritize control signaling (e.g., HD PUCCH) over other content (e.g., over the HD/FD PUSCH, FD/HD SRS, or FD/HD PRACH). In other aspects, the UE may prioritize a different type of content over the control signaling, e.g., prioritizing FD/HD PUSCH, SRS, or PRACH over transmission of the HD PUCCH. If both signals are control signaling, e.g., overlapping FD PUCCH and HD PUCCH, the UE may prioritize among the control signals based on a duplex mode. Similarly, after prioritizing based on duplex type, the UE may prioritize among overlapping signals within the duplex type group based on content. The UE may use the beam of the higher priority UL signal to transmit both UL signals from a same antenna panel. The base station may prioritize reception of the higher priority UL signal and/or may use the priority rule to determine the beam that the UE will use to transmit both UL signals.

In a third example, the UE may be scheduled for an FD PUSCH transmission that overlaps with one of the HD PUSCH, the FD/HD SRS, or the FD/HD PRACH. In some aspects, the UE may prioritize a HD signal (e.g., the HD PUSCH, HD SRS, or HD PRACH) over the FD PUSCH based on a duplex mode grouping. In some aspects, the UE may prioritize the FD PUSCH over a HD signal (e.g., the HD PUSCH, HD SRS, or HD PRACH) based on a duplex mode grouping. In some aspects, the UE may prioritize PUSCH over other content (e.g., over the FD/HD SRS, or FD/HD PRACH). In other aspects, the UE may prioritize a different type of content over the data, e.g., prioritizing SRS, or PRACH over transmission of the FD PUSCH. If both signals are data, e.g., overlapping FD PUSCH and HD PUSCH, the UE may prioritize among the control signals based on a duplex mode. Similarly, after prioritizing based on duplex type, the UE may prioritize among overlapping signals within the duplex type group based on content. The UE may use the beam of the higher priority UL signal to transmit both UL signals from a same antenna panel. The base station may prioritize reception of the higher priority UL signal and/or may use the priority rule to determine the beam that the UE will use to transmit both UL signals.

In a fourth example, the UE may be scheduled for an HD PUSCH transmission that overlaps with one of the FD/HD SRS, or the FD/HD PRACH. In some aspects, the UE may prioritize a HD signal (e.g., the HD PUSCH) over an FD signal (e.g., the FD PUSCH, FD SRS, or FD PRACH) based on a duplex mode grouping. In some aspects, the UE may prioritize an FD signal (e.g., the FD PUSCH, FD SRS, or FD PRACH) over the HD signal (e.g., the HD PUSCH) based on a duplex mode grouping. In some aspects, the UE may prioritize PUSCH over other content (e.g., over the FD/HD SRS, or FD/HD PRACH). In other aspects, the UE may prioritize a different type of content over the data, e.g., prioritizing SRS, or PRACH over transmission of the HD PUSCH. If both signals are data, e.g., overlapping FD PUSCH and HD PUSCH, the UE may prioritize among the control signals based on a duplex mode. Similarly, after prioritizing based on duplex type, the UE may prioritize among overlapping signals within the duplex type group based on content. The UE may use the beam of the higher priority UL signal to transmit both UL signals from a same antenna panel. The base station may prioritize reception of the higher priority UL signal and/or may use the priority rule to determine the beam that the UE will use to transmit both UL signals.

In a fifth example, the UE may be scheduled for an FD SRS transmission that overlaps with one of the HD SRS, or the FD/HD PRACH. In some aspects, the UE may prioritize a HD signal (e.g., HD SRS or HD PRACH) over the FD SRS based on a duplex mode grouping. In some aspects, the UE may prioritize the FD SRS over a HD signal (e.g., the HD SRS or HD PRACH) based on a duplex mode grouping. In some aspects, the UE may prioritize SRS over other content (e.g., over FD/HD PRACH or other content). In other aspects, the UE may prioritize a different type of content over the SRS, e.g., prioritizing PRACH over transmission of the FD SRS. If both signals are SRS, e.g., overlapping FD SRS and HD SRS, the UE may prioritize among the control signals based on a duplex mode. Similarly, after prioritizing based on duplex type, the UE may prioritize among overlapping signals within the duplex type group based on content. The UE may use the beam of the higher priority UL signal to transmit both UL signals from a same antenna panel. The base station may prioritize reception of the higher priority UL signal and/or may use the priority rule to determine the beam that the UE will use to transmit both UL signals.

In a sixth example, the UE may be scheduled for an HD SRS transmission that overlaps with one of the FD/HD PRACH. In some aspects, the UE may prioritize a FD signal (e.g., FD SRS or FD PRACH) over the HD SRS based on a duplex mode grouping. In some aspects, the UE may prioritize the HD SRS over a FD signal (e.g., the FD SRS or FD PRACH) based on a duplex mode grouping. In some aspects, the UE may prioritize SRS over other content (e.g., over FD/HD PRACH or other content). In other aspects, the UE may prioritize a different type of content over the SRS, e.g., prioritizing PRACH over transmission of the HD SRS. If both signals are SRS, e.g., overlapping FD SRS and HD SRS, the UE may prioritize among the control signals based on a duplex mode. Similarly, after prioritizing based on duplex type, the UE may prioritize among overlapping signals within the duplex type group based on content. The UE may use the beam of the higher priority UL signal to transmit both UL signals from a same antenna panel. The base station may prioritize reception of the higher priority UL signal and/or may use the priority rule to determine the beam that the UE will use to transmit both UL signals.

In a seventh example, the UE may be scheduled for an FD PRACH transmission that overlaps with HD PRACH. In some aspects, the UE may prioritize a HD signal (e.g., HD PRACH) over the FD PRACH based on a duplex mode grouping. In some aspects, the UE may prioritize the FD PRACH over a HD signal (e.g., the HD PRACH) based on a duplex mode grouping. The UE may use the beam of the higher priority UL signal to transmit both UL signals from a same antenna panel. The base station may prioritize reception of the higher priority UL signal and/or may use the priority rule to determine the beam that the UE will use to transmit both UL signals.

For example, the UE and base station may prioritize the FD transmissions over HD transmissions, and prioritize the PRACH over the PUCCH, the PUCCH over the PUSCH, or the PUSCH over the SRS.

In order to identify the duplex mode of the uplink transmissions to apply the prioritization rule, the UE and/or the base station may identify the duplex mode of the scheduled UL HD/FD signals. In some aspects, the duplex mode of the UL transmission may be implicitly indicated in the UL TCI state. That is, if the TCI state associated with the UL transmission may indicate a bi-directional RS pair, and the base station and the UE may determine, based on the implicit indication, that the duplex mode of the scheduled UL transmission is in the FD mode. If TCI state associated with the UL transmission may indicate a single directional RS with spatial relation information, the base station and the UE may implicitly identify that the duplex mode of the received UL transmission is in the HD mode.

In some aspects, the duplex mode of the UL transmission may be explicitly indicated in the signal, in a configuration for the signal, or in scheduling information for the signal, with one or more bit. The indication may include a single bit (e.g. 1 for FD or 0 or HD or vice versa). That is, the configuration for the UL transmission may include one or more bit to indicate the UE the duplex mode of the UL transmission to be transmitted to the base station. For example, the one or more bit may be added in RRC configuration to indicate the duplex mode of the PUCCH. For example, the one or more bit may be added in DCI to indicate the duplex mode of the PUSCH. For example, the one or more bit may be added in RRC configuration to indicate the duplex mode of the SRS. The one or more bit indicating the duplex mode of the UL transmission may be an additional bit added to the configuration of the respective UL transmissions or configured from an existing field within the configuration of the respective UL transmissions, such as a reserved bit within the configuration.

The UE may identify the duplex mode of the PRACH transmission based on the defined HD preamble group and FD preamble group. That is, the UE may identify the duplex mode of the PRACH transmission based on the preamble group of the PRACH transmission. The HD PRACH transmission and the FD PRACH transmission may have separately defined preamble groups. Similarly, the base station may determine the duplex mode of the PRACH transmission based on the preamble group of the received PRACH transmission.

Figure 6:
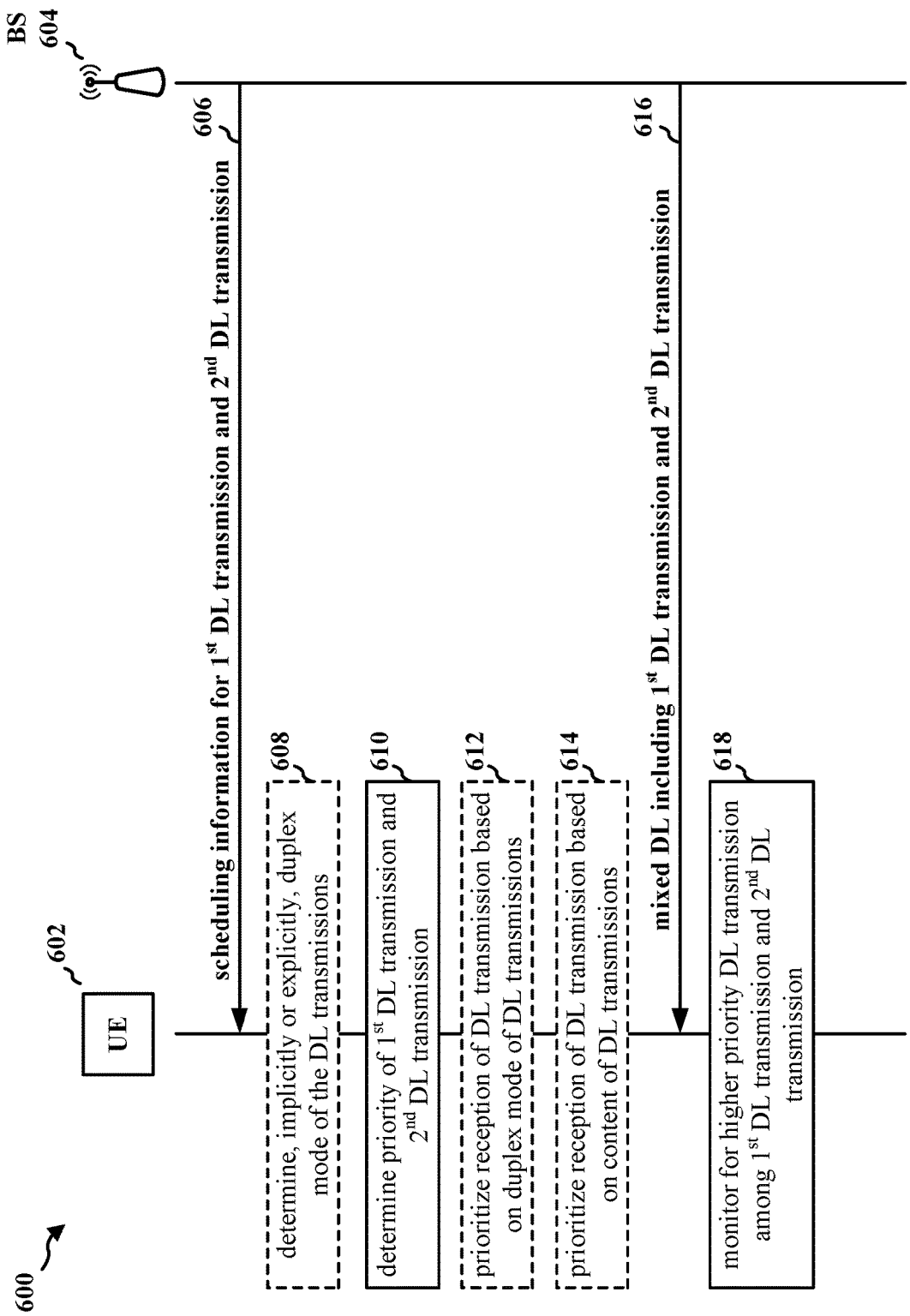
FIG. 6 is a call-flow chart of a method of wireless communication.

FIG. 6 is a call-flow chart 600 of a method of wireless communication. The call-flow chart 600 may include a UE 602 and a base station 604. At 606, the UE 602 may receive, from the base station, scheduling information for a first DL transmission in a first transmission group associated with half-duplex mode and a second DL transmission in a second transmission group associated with full duplex mode.

At 608, the UE 602 may determine, implicitly or explicitly, the duplex mode of the first DL transmission and the DL second transmission. In some aspects, the UE 602 may determine the duplex mode of the first DL transmission and the DL second transmission implicitly based on the TCI state associated with the first DL transmission and the second DL transmission. The UE 602 may determine the second DL transmission to be associated with the full duplex mode based on the TCI state indicating a bi-directional RS pair, and the UE 602 determines the first DL transmission to be associated with the half-duplex mode based on the TCI state indicating a single directional RS. The UE 602 may implicitly determine that the first DL transmission or the second DL transmission of an SSB is in the full duplex mode based on the SSB being transmitted simultaneously with a UL transmission.

In some aspects, the UE 602 may explicitly determine the duplex mode of the first DL transmission or the second DL transmission based on an indication of the duplex mode in a configuration of the first DL transmission or the second DL transmission. The indication may include one or more bit included in one of an RRC configuration for CORESET and CSI-RS, or DCI for PDSCH. The indication may also be included in the SSB transmission configuration of the first DL transmission or the second DL transmission.

At 610, the UE 602 may determine priorities of the first DL transmission and the second DL transmission based on the first transmission group and second transmission group associated with the first DL transmission and the second DL transmission. The priorities of the first DL transmission and the second DL transmission may be determined based on the duplex modes of the first transmission group and the second transmission group. Also, the priorities of the first DL transmission and the second DL transmission may be determined based on the content of the first DL transmission and the second DL transmission.

At 612, the UE 602 may determine the priorities of the first DL transmission and the second DL transmission based on duplex modes of the first transmission group and the second transmission group. In one aspect, the UE 602 may prioritize a search for the first DL transmission of the first transmission group associated with the half-duplex mode over the search for the second DL transmission of the second transmission group associated with the full duplex mode. In another aspect, the UE 602 may prioritize a search for the second DL transmission of the second transmission group associated with the full duplex mode over the search for the first DL transmission of the first transmission group associated with the half-duplex mode.

At 614, the UE 602 may prioritize DL transmission based on the content of DL transmissions. That is, the priorities of the first DL transmission and the DL second transmission may be determined further based on the content of the first DL transmission and the second DL transmission. The contents of the DL transmissions may include one of the CORESET for a PDCCH, the CSI-RS, the PDSCH, or the SSB. The UE 602 may also receive a configuration for multiple CORESETs within the first transmission group or the second transmission group and monitor for a CORESET, from the multiple CORESETs, corresponding to a CSS set or a USS set having the lowest index in a cell with the lowest index containing CSS if the UE 602 is configured.

At 616, the base station 604 may transmit a mixed DL transmission including the first DL transmission of a first duplex mode and the second DL transmission of a second duplex mode to the UE, and the UE 602 may receive one or more of the mixed DL transmission including the first DL transmission and the second DL transmission from the base station. In some examples, such as for CORESET, the base station may or may not transmit an actual downlink signal. The UE may apply a prioritization rule to determine whether to monitor the CORESET. In one aspect, the first DL transmission and the second DL transmission may be received on two different antenna panels of the UE. In some aspects, the first DL transmission and the second DL transmission may be scheduled for transmission in different component carriers or the same component carrier.

At 618, the UE 602 may monitor for a higher priority DL transmission among the first DL transmission and the second DL transmission. In some examples, the UE may monitor for the higher priority DL transmission before monitoring for the lower priority DL transmission.

Figure 7:
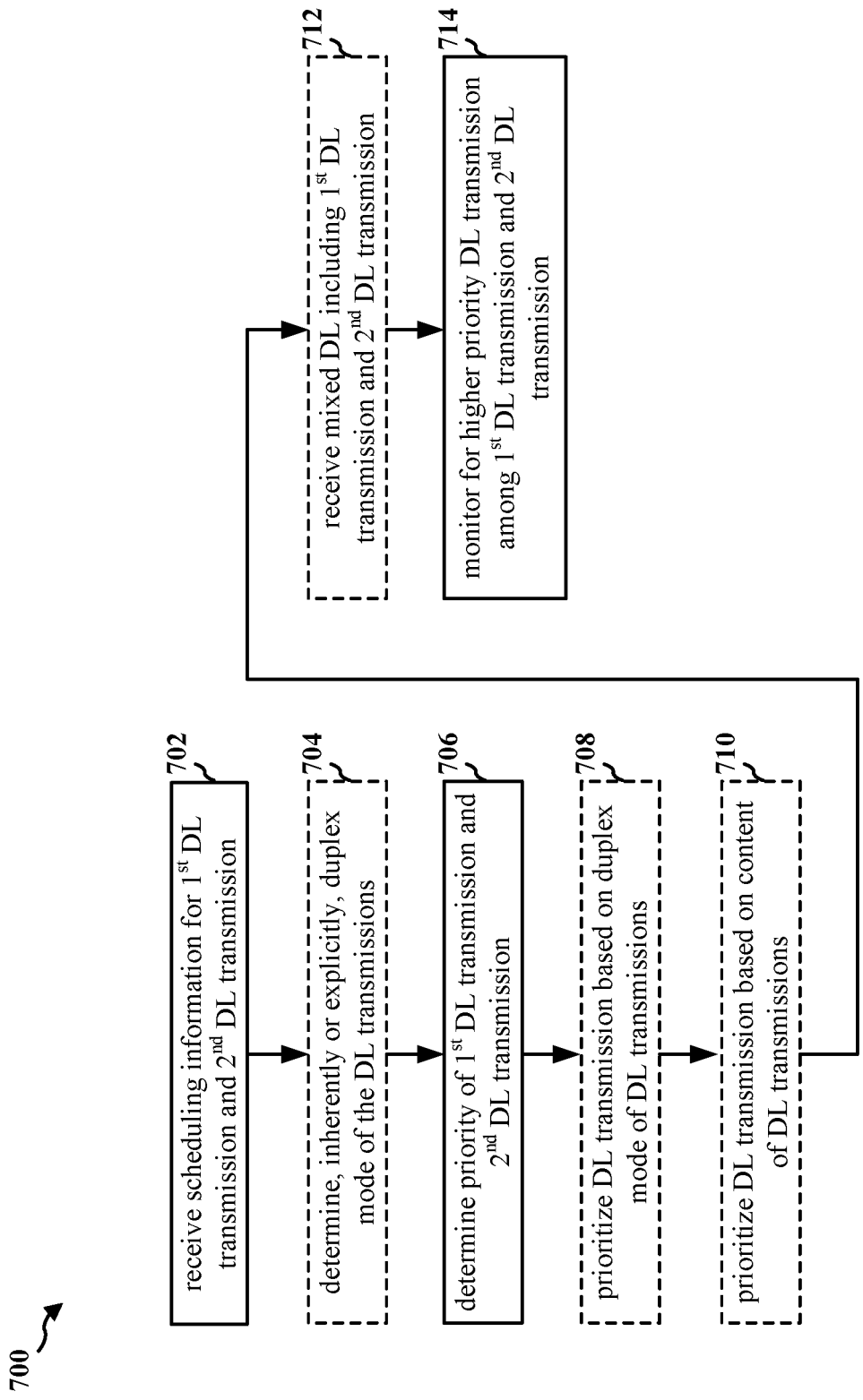
FIG. 7 is a flowchart of a method of wireless communication.

FIG. 7 is a flowchart 700 of a method of wireless communication. The method may be performed by a UE (e.g., the UE 104; the apparatus 1102). At 702, the UE may receive, from the base station, scheduling information for a first DL transmission in a first transmission group associated with half-duplex mode and a second DL transmission in a second transmission group associated with full duplex mode (i.e., as at 606). For example, 702 may be performed by a mixed DL transmission managing component 1140.

At 704, the UE may determine, implicitly or explicitly, the duplex mode of the first DL transmission and the DL second transmission (i.e., as at 608). The UE may determine the duplex mode of the first DL transmission and the DL second transmission implicitly based on the TCI state associated with the first DL transmission and the second DL transmission. The UE may determine the second DL transmission to be associated with the full duplex mode based on the TCI state indicating a bi-directional RS pair, and the UE determines the first DL transmission to be associated with the half-duplex mode based on the TCI state indicating a single directional RS. The UE may implicitly determine that the first DL transmission or the second DL transmission of an SSB is in the full duplex mode based on the SSB being transmitted simultaneously with a UL transmission. The UE may explicitly determine the duplex mode of the first DL transmission or the second DL transmission based on an indication of the duplex mode in a configuration of the first DL transmission or the second DL transmission. The indication may include one or more bit included in one of an RRC configuration for CORESET and CSI-RS, or DCI for PDSCH. The indication may also be included in the SSB transmission configuration of the first DL transmission or the second DL transmission. For example, 704 may be performed by the mixed DL transmission managing component 1140.

At 706, the UE may determine priorities of the first DL transmission and the second DL transmission based on the first transmission group and second transmission group associated with the first DL transmission and the second DL transmission (i.e., as at 610). The priorities of the first DL transmission and the second DL transmission may be determined based on the duplex modes of the first transmission group and the second transmission group. Also, the priorities of the first DL transmission and the second DL transmission may be determined based on the content of the first DL transmission and the second DL transmission. For example, 706 may be performed by the mixed DL transmission managing component 1140.

At 708, the UE may determine the priorities of the first DL transmission and the second DL transmission based on duplex modes of the first transmission group and the second transmission group (i.e., as at 612). The UE may prioritize a search for the first DL transmission of the first transmission group associated with the half-duplex mode over the search for the second DL transmission of the second transmission group associated with the full duplex mode. The UE may prioritize a search for the second DL transmission of the second transmission group associated with the full duplex mode over the search for the first DL transmission of the first transmission group associated with the half-duplex mode. For example, 708 may be performed by the mixed DL transmission managing component 1140.

At 710, the UE may prioritize DL transmission based on the content of DL transmissions (i.e., as at 614). The priorities of the first DL transmission and the second DL transmission may be determined further based on the content of the first DL transmission and the second DL transmission. The contents of the DL transmissions may include one of the CORESET for a physical downlink control channel (PDCCH), the CSI-RS, the PDSCH, or the SSB. The UE may also receive a configuration for multiple CORESETs within the first transmission group or the second transmission group and monitor for a CORESET, from the multiple CORESETs, corresponding to a CSS set or a USS set having the lowest index in a cell with the lowest index containing CSS if the UE is configured. For example, 710 may be performed by the mixed DL transmission managing component 1140.

At 712, the UE may receive the mixed DL transmission including the first DL transmission and the second DL transmission from the base station (i.e., as at 616). The first DL transmission and the second DL transmission may be received on two different antenna panels of the UE. In some aspects, the first DL transmission and the second DL transmission may be scheduled for transmission in different component carriers or the same component carrier. For example, 712 may be performed by the mixed DL transmission managing component 1140.

At 714, the UE may monitor for a higher priority DL transmission among the first DL transmission and the second DL transmission (i.e., as at 618). For example, 714 may be performed by the mixed DL transmission managing component 1140.

Figure 8:
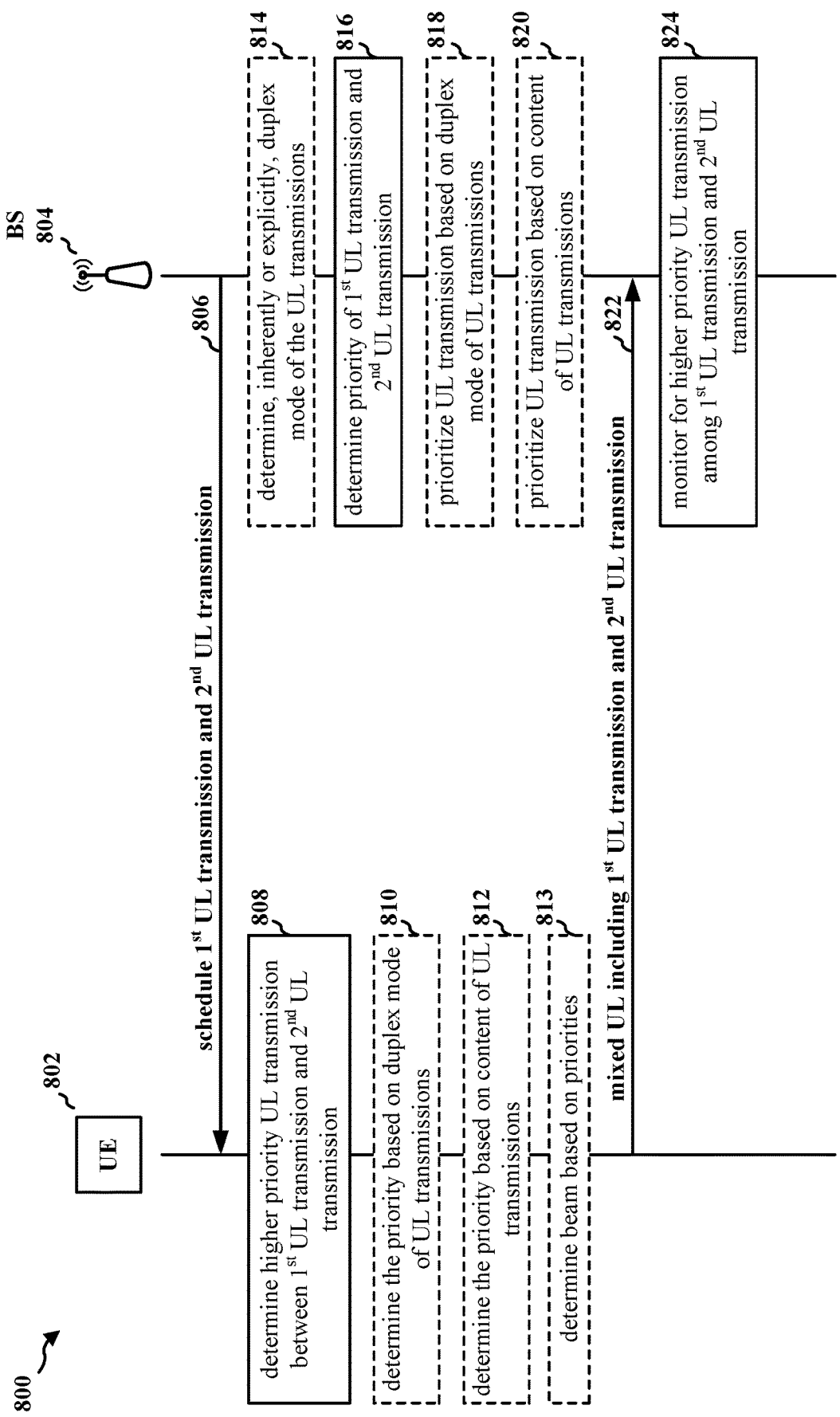
FIG. 8 is a call-flow chart of a method of wireless communication.

FIG. 8 is a call-flow chart 800 of a method of wireless communication. The call-flow chart 800 may include a UE 802 and a base station 804. At 806, the base station 804 may schedule a UE 802 for a first UL transmission included in a first UL transmission group associated with a half-duplex mode and a second UL transmission included in a second UL transmission group associated with a full-duplex mode. The UE 802 may receive a scheduling information for the first UL transmission and the second UL transmission from the base station 804.

At 808, the UE 802 may determine a higher priority UL transmission between the first UL transmission associated with the half-duplex mode and the second UL transmission associated with the full-duplex mode.

At 810, the UE 802 may determine the priority based on the duplex mode of the first UL transmission and the second UL transmission. In some aspects, the duplex mode of the first UL transmission or the second UL transmission may be implicitly determined based on a UL TCI state or spatial relation information of a respective transmission. The UE 802 may determine the second UL transmission to be associated with the full duplex mode based on the TCI state indicating a bi-directional RS pair, and the UE 802 may determine the first UL transmission to be associated with the half-duplex mode based on the TCI state or the spatial relation information indicating a single directional RS. In some aspects, the duplex mode of the first UL transmission or the second UL transmission may be explicitly determined based on an indication in a configuration for a respective UL transmission. In one aspect, the indication may include one or more bit in one of the RRC configuration or the DCI for the respective UL transmission.

At 812, the UE 802 may determine the priority based on the content of the first UL transmission and the second UL transmission. In some aspects, the contents may include one of the PUCCH, the SRS, the PUSCH, or the PRACH. At 813, the UE 802 may determine one or more beams to transmit the first UL transmission and the second transmission to the base station 804. The UE 802 may determine a beam to transmit the UL transmissions from a same antenna panel based on the priorities of the UL transmissions. The UE 802 may determine to transmit the UL transmissions from different antenna panels based on the priorities of the UL transmissions.

At 814, the base station 804 may determine, implicitly or explicitly, the duplex mode of the first UL transmission and the UL second transmission. In some aspects, the base station 804 may determine a duplex mode of the first UL transmission and the second UL transmission based on the TCI states associated with the first UL transmission and the second UL transmission. The base station 804 may implicitly determine the second UL transmission to be associated with the full duplex mode based on the TCI state indicating a bi-directional RS pair, and determine the first UL transmission to be associated with the half-duplex mode based on the TCI state indicating a single directional RS. The base station 804 may determine the duplex mode of the first UL transmission or the second UL transmission based on an indication of the duplex mode in a configuration of the first UL transmission or the second UL transmission.

In some aspects, the base station 804 may explicitly determine the duplex mode of the first UL transmission or the second UL transmission based on an indication of the duplex mode in the configuration of the first UL transmission or the second UL transmission. The indication may include one or more bit included in one of the RRC configuration for PUCCH and SRS, or DCI for the PUSCH. The duplex mode of the first transmission group or the second transmission group may be determined based on PRACH preambles of the first UL transmission or the second UL transmission.

At 816, the base station 804 may determine a higher priority UL transmission between a first UL transmission associated with a half-duplex mode and a second UL transmission associated with a full-duplex mode. In some aspects, the priorities of the first UL transmission and the second UL transmission may be determined based on duplex modes of the first transmission group and the second transmission group. In some aspects, the priorities of the first UL transmission and the second transmission may be determined further based on the content of the first UL transmission and the second UL transmission.

At 818, the base station 804 may prioritize a search for the first UL transmission and the second UL transmission based on the duplex mode of the first UL transmission and the second UL transmission. In one aspect, the base station 804 may prioritize a search for the first UL transmission of the first transmission group associated with the half-duplex mode over the search for the second UL transmission of the second transmission group associated with the full duplex mode. In one aspect, the base station 804 may prioritize a search for the second UL transmission of the second transmission group associated with the full duplex mode over the search for the first UL transmission of the first transmission group associated with the half-duplex mode.

At 820, the base station 804 may prioritize the first UL transmission and the second UL transmission based on the content of the first UL transmission and the second UL transmission. That is, the priorities of the first UL transmission and the second transmission may be determined further based on the content of the first UL transmission and the second UL transmission. The contents including one of the PUCCH, the SRS, the PUSCH, or the PRACH.

At 822, the UE 802 may transmit the first UL transmission and the second UL transmission simultaneously using the beam of the higher priority UL transmission, and the base station 804 may receive the mixed UL transmission including the first UL transmission and the second UL transmission. The first UL transmission and the second UL transmission may be scheduled for transmission in different component carriers or in the same component carrier.

At 824, the base station 804 may monitor for the first UL transmission and the second UL transmission using a beam of the higher priority UL transmission.

Figure 9:
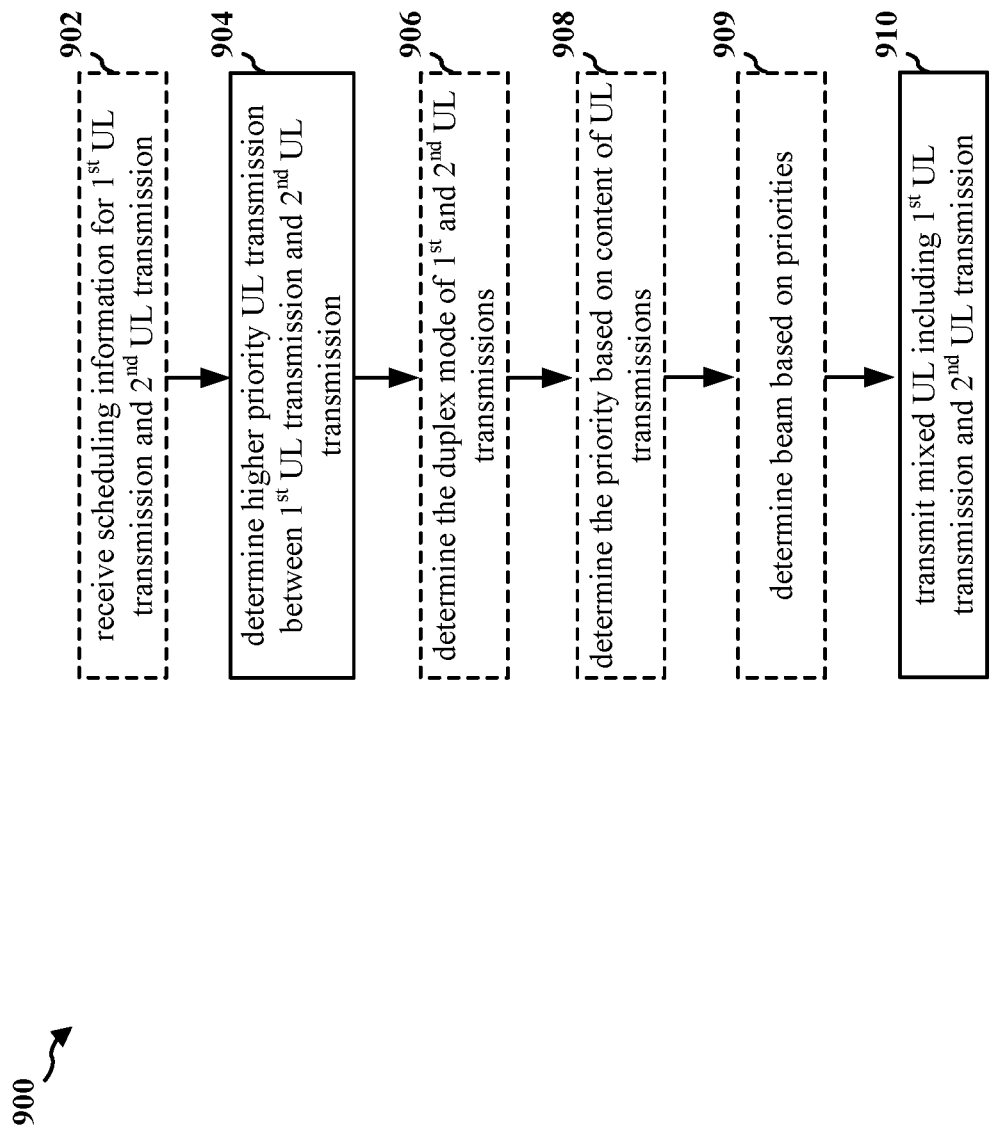
FIG. 9 is a flowchart of a method of wireless communication.

FIG. 9 is a flowchart 900 of a method of wireless communication. The method may be performed by a UE (e.g., the UE 104; the apparatus 1102). Optional aspects are illustrated with a dashed line. At 902, the UE may receive a scheduling information for the first UL transmission and the second UL transmission from the base station (i.e., as at 806). For example, 902 may be performed by a mixed UL transmission managing component 1142.

At 904, the UE may determine a higher priority UL transmission between the first UL transmission associated with the half-duplex mode and the second UL transmission associated with the full-duplex mode (e.g., as at 808). For example, 904 may be performed by the mixed UL transmission managing component 1142.

At 906, the UE may determine the priority based on the duplex mode of the first UL transmission and the second UL transmission (e.g., as at 810). The duplex mode of the first UL transmission or the second UL transmission may be implicitly determined based on a UL TCI state or spatial relation information of a respective transmission. The UE may determine the second UL transmission to be associated with the full duplex mode based on the TCI state indicating a bi-directional RS pair, and the UE may determine the first UL transmission to be associated with the half-duplex mode based on the TCI state or the spatial relation information indicating a single directional RS. The duplex mode of the first UL transmission or the second UL transmission may be explicitly determined based on an indication in a configuration for a respective UL transmission. The indication may include one or more bit in one of the RRC configuration or the DCI for the respective UL transmission. For example, 906 may be performed by the mixed UL transmission managing component 1142.

At 908, the UE may determine the priority based on the content of the first UL transmission and the second UL transmission (e.g., as at 812). The contents may include one of the PUCCH, the SRS, the PUSCH, or the PRACH. For example, 908 may be performed by the mixed UL transmission managing component 1142.

At 909, the UE may determine the UE may determine one or more beams to transmit the first UL transmission and the second transmission to the base station (e.g., as at 813). The UE may determine a beam to transmit the UL transmissions from a same antenna panel based on the priorities of the UL transmissions. The UE may determine to transmit the UL transmissions from different antenna panels based on the priorities of the UL transmissions. For example, 909 may be performed by the mixed UL transmission managing component 1142.

At 910, the UE may transmit the first UL transmission and the second UL transmission simultaneously using the beam of the higher priority UL transmission (e.g., as at 822). The first UL transmission and the second UL transmission may be scheduled for transmission in different component carriers or in the same component carrier. For example, 910 may be performed by the mixed UL transmission managing component 1142.

Figure 10:
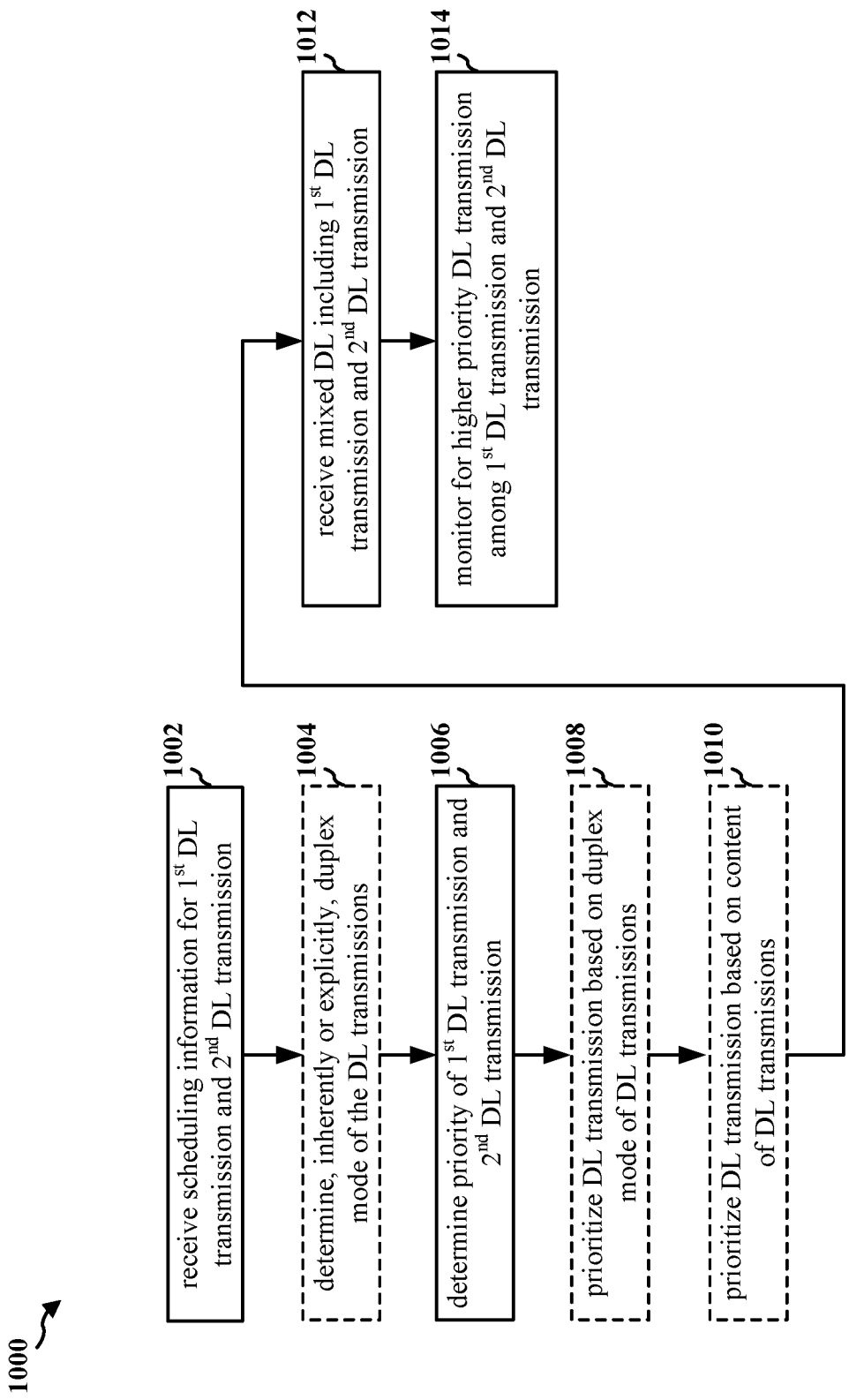
FIG. 10 is a flowchart of a method of wireless communication.

FIG. 10 is a flowchart 1000 of a method of wireless communication. The method may be performed by a base station (e.g., the base station 102/180; the apparatus 1202). At 1002, the base station may schedule a UE for a first UL transmission included in a first UL transmission group associated with a half-duplex mode and a second UL transmission included in a second UL transmission group associated with a full-duplex mode (e.g., as at 806). For example, 1002 may be performed by a mixed UL transmission managing component 1242.

At 1004, the base station may determine, implicitly or explicitly, the duplex mode of the first UL transmission and the UL second transmission (e.g., as at 814). The base station may determine a duplex mode of the first UL transmission and the second UL transmission based on the TCI states associated with the first UL transmission and the second UL transmission. The base station may implicitly determine the second UL transmission to be associated with the full duplex mode based on the TCI state indicating a bi-directional RS pair, and determine the first UL transmission to be associated with the half-duplex mode based on the TCI state indicating a single directional RS. The base station may determine the duplex mode of the first UL transmission or the second UL transmission based on an indication of the duplex mode in a configuration of the first UL transmission or the second UL transmission. The base station may explicitly determine the duplex mode of the first UL transmission or the second UL transmission based on an indication of the duplex mode in the configuration of the first UL transmission or the second UL transmission. The indication may include one or more bit included in one of the RRC configuration for PUCCH and SRS, or DCI for the PUSCH. The duplex mode of the first transmission group or the second transmission group may be determined based on PRACH preambles of the first UL transmission or the second UL transmission. For example, 1004 may be performed by the mixed UL transmission managing component 1242.

At 1006, the base station may determine a higher priority UL transmission between a first UL transmission associated with a half-duplex mode and a second UL transmission associated with a full-duplex mode (e.g., as at 816). The priorities of the first UL transmission and the second UL transmission may be determined based on duplex modes of the first transmission group and the second transmission group. The priorities of the first UL transmission and the second transmission may be determined further based on the content of the first UL transmission and the second UL transmission. For example, 1006 may be performed by the mixed UL transmission managing component 1242.

At 1008, the base station may prioritize a search for the first UL transmission and the second UL transmission based on the duplex mode of the first UL transmission and the second UL transmission (e.g., as at 818). The base station may prioritize a search for the first UL transmission of the first transmission group associated with the half-duplex mode over the search for the second UL transmission of the second transmission group associated with the full duplex mode. The base station may prioritize a search for the second UL transmission of the second transmission group associated with the full duplex mode over the search for the first UL transmission of the first transmission group associated with the half-duplex mode. For example, 1008 may be performed by the mixed UL transmission managing component 1242.

At 1010, the base station may prioritize the first UL transmission and the second UL transmission based on the content of the first UL transmission and the second UL transmission (e.g., as at 820). The priorities of the first UL transmission and the second transmission may be determined further based on the content of the first UL transmission and the second UL transmission. The contents including one of the PUCCH, the SRS, the PUSCH, or the PRACH. For example, 1010 may be performed by the mixed UL transmission managing component 1242.

At 1012, the base station may receive the mixed UL transmission including the first UL transmission and the second UL transmission (e.g., as at 822). The first UL transmission and the second UL transmission may be scheduled for transmission in different component carriers or in the same component carrier. For example, 1012 may be performed by the mixed UL transmission managing component 1242.

At 1014, the base station may monitor for the first UL transmission and the second UL transmission using a beam of the higher priority UL transmission (e.g., as at 824). For example, 1014 may be performed by the mixed UL transmission managing component 1242.

Figure 11:
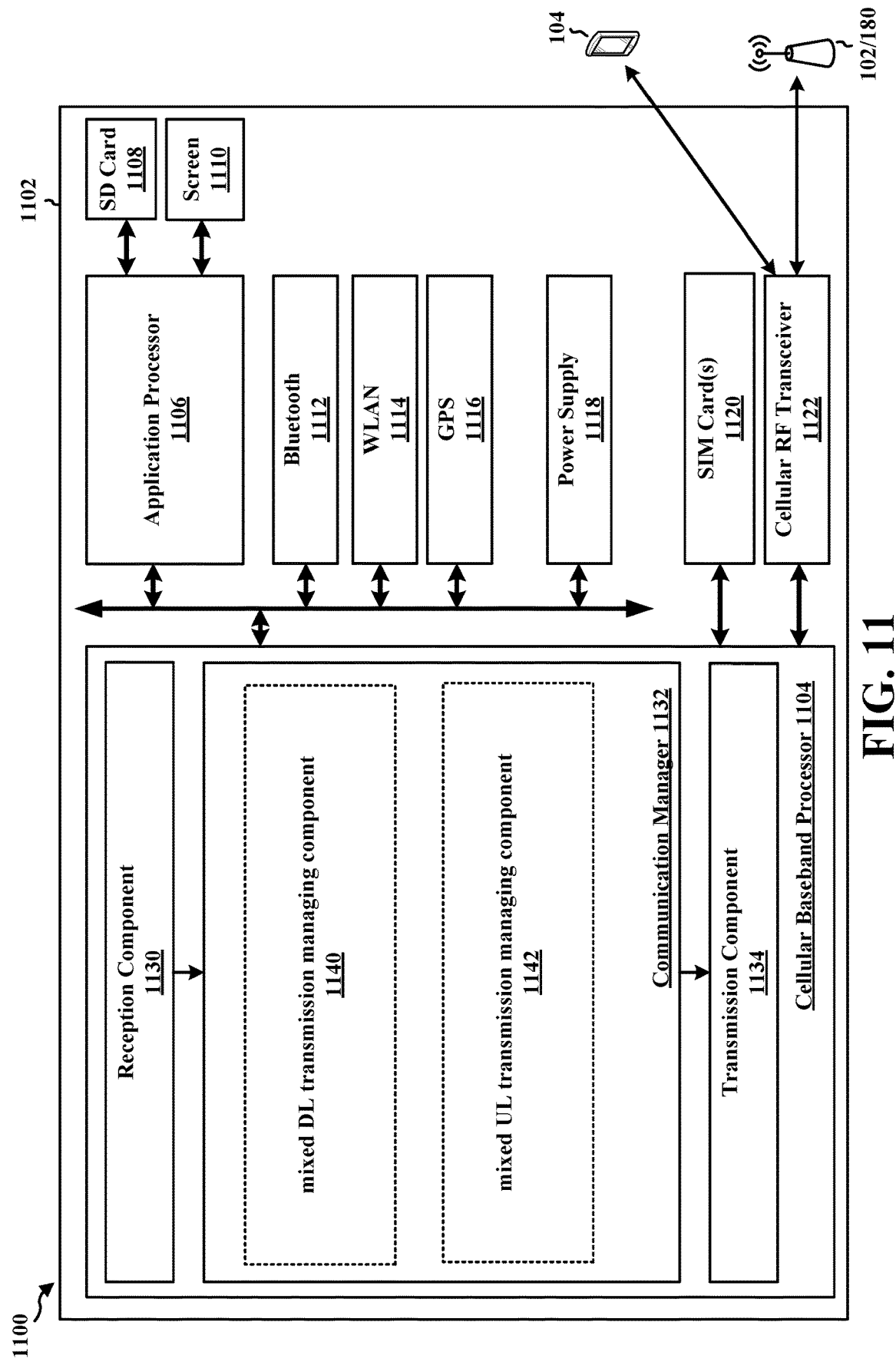
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/ memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a mixed DL transmission managing component 1140 that is configured to receive scheduling information for a first DL transmission in a first transmission group associated with half-duplex mode and a second DL transmission in a second transmission group associated with full duplex mode, determine the duplex mode of the first DL transmission and the DL second transmission, determine priorities of the first DL transmission and the second DL transmission based on duplex mode or the content, receive the mixed DL transmission including the first DL transmission and the second DL transmission from the base station, and monitor for a higher priority DL transmission among the first DL transmission and the second DL transmission, e.g., as described in connection with 702, 704, 706, 708, 710, 712, and 714. The communication manager 1132 further includes a mixed UL transmission managing component 1142 that is configured to receive a scheduling information for the first UL transmission and the second UL transmission, determine a higher priority UL transmission between the first UL transmission associated with the half-duplex mode and the second UL transmission associated with the full-duplex mode, determine the priority based on the duplex mode or the content of the first UL transmission and the second UL transmission, and transmit the first UL transmission and the second UL transmission simultaneously using the beam of the higher priority UL transmission, e.g., as described in connection with 902, 904, 906, 908, and 910.

The apparatus may include additional components that perform each of the blocks of the algorithm in the aforementioned flowcharts of FIGS. 6, 7, and 9. As such, each block in the aforementioned flowcharts of FIGS. 6, 7, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from a base station, scheduling information for a first DL transmission included in a first transmission group associated with half-duplex mode and a second DL transmission included in a second transmission group associated with full duplex mode, means for determining priorities of the first DL transmission and the second DL transmission based on the first transmission group and second transmission group associated with the first DL transmission and the second DL transmission, and means for monitoring for a higher priority DL transmission among the first DL transmission and the second DL transmission. The apparatus 1102 includes means for prioritizing a search for the first DL transmission of the first transmission group associated with the half-duplex mode over the search for the second DL transmission of the second transmission group associated with the full duplex mode, and means for prioritizing a search for the second DL transmission of the second transmission group associated with the full duplex mode over the search for the first DL transmission of the first transmission group associated with the half-duplex mode. The apparatus 1102 includes means for receiving a configuration for multiple CORESETs within the first transmission group or the second transmission group, and means for monitoring for a CORESET, from the multiple CORESETs, corresponding to a CSS set or a UE specific search space (USS) set having a lowest index in a cell with a lowest index containing CSS if the UE is configured. The apparatus 1102 includes means for determining a duplex mode of the first DL transmission and the DL second transmission based on a TCI state associated with the first DL transmission and the second DL transmission, and means for determining that the first DL transmission or the second DL transmission of an SSB is in the full duplex mode based on the SSB being transmitted simultaneously with an UL transmission. The apparatus 1102 includes means for determining a duplex mode of the first DL transmission or the second DL transmission based on an indication of the duplex mode in a configuration of the first DL transmission or the second DL transmission. The apparatus 1102 includes means for determining a higher priority UL transmission between a first UL transmission associated with a half-duplex mode and a second UL transmission associated with a full-duplex mode, and means for transmitting the first UL transmission and the second UL transmission simultaneously using a beam of the higher priority UL transmission. The apparatus 1102 includes means for determining the duplex mode of the first UL transmission or the second UL transmission based on an UL TCI state or spatial relation information of a respective transmission, and means for determining the duplex mode of the first UL transmission or the second UL transmission based on an indication in a configuration for a respective UL transmission. The apparatus 1102 includes means for using a first preamble from a half-duplex preamble group to transmit a random access channel for the first UL transmission or using a second preamble from a full duplex preamble group to transmit the random access channel for the second UL transmission. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a mixed DL transmission managing component 1240 that is configured to schedule a UE for a first DL transmission in a first transmission group associated with half-duplex mode and a second DL transmission in a second transmission group associated with full duplex mode, and transmit a mixed DL transmission including the first DL transmission and the second DL transmission to the UE, e.g., as described in connection with 606 and 616. The communication manager 1232 further includes a mixed UL transmission managing component 1242 that is configured to schedule a UE for a first UL transmission included in a first UL transmission group associated with a half-duplex mode and a second UL transmission included in a second UL transmission group associated with a full-duplex mode, determine, implicitly or explicitly, the duplex mode of the first UL transmission and the UL second transmission, determine a higher priority UL transmission between the first UL transmission and the second UL transmission based on the duplex mode or the content of the first UL transmission and the second UL transmission, and receive the mixed UL transmission including the first UL transmission and the second UL transmission, e.g., as described in connection with 1002, 1004, 1006, 1008, 1010, 1012, and 1014.

The apparatus may include additional components that perform each of the blocks of the algorithm in the aforementioned flowcharts of FIGS. 8 and 10. As such, each block in the aforementioned flowcharts of FIGS. 8 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for scheduling a user equipment (UE) for a first uplink (UL) transmission included in a first UL transmission group associated with a half-duplex mode and a second UL transmission included in a second UL transmission group associated with a full-duplex mode, means for determining a higher priority UL transmission between a first UL transmission associated with a half-duplex mode and a second UL transmission associated with a full-duplex mode, and means for monitoring for the first UL transmission and the second UL transmission using a beam of the higher priority UL transmission. The apparatus 12092 may include means for prioritizing a search for the first UL transmission of the first transmission group associated with the half-duplex mode over the search for the second UL transmission of the second transmission group associated with the full duplex mode, and means for prioritizing a search for the second UL transmission of the second transmission group associated with the full duplex mode over the search for the first UL transmission of the first transmission group associated with the half-duplex mode. The apparatus 12092 may include means for determining a duplex mode of the first UL transmission and the second UL transmission based on a transmission configuration indication (TCI) states associated with the first UL transmission and the second UL transmission and means for determining a duplex mode of the first UL transmission or the second UL transmission based on an indication of the duplex mode in a configuration of the first UL transmission or the second UL transmission, and means for determining a duplex mode of the first transmission group or the second transmission group based on PRACH preambles of the first UL transmission or the second UL transmission. The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Referring again to FIGS. 5, 6, 7, 8, 9, 10, and 11, a UE may receive, from a base station, scheduling information for a first DL transmission associated with half-duplex mode and a second DL transmission associated with full duplex mode, determine priorities of the first DL transmission and the second DL transmission, and monitor for a higher priority DL transmission among the first DL transmission and the second DL transmission. The priorities of the first DL transmission and the second DL transmission is determined based on duplex modes of the first transmission group and the second transmission group. The UE may prioritize a search for the first DL transmission of the first transmission group associated with the half-duplex mode over the search for the second DL transmission of the second transmission group associated with the full duplex mode. The UE may determine a duplex mode of the first DL transmission and the DL second transmission implicitly or explicitly.

The UE may prioritize a search for the second DL transmission of the second transmission group associated with the full duplex mode over the search for the first DL transmission of the first transmission group associated with the half-duplex mode. The priorities of the first DL transmission and the second transmission may be determined based on content of the first DL transmission and the second DL transmission, the contents including one of a CORESET for a PDCCH, a CSI-RS, a PDSCH, or a SSB.

The first DL transmission and the second DL transmission may be scheduled for transmission in different component carriers. The first DL transmission and the second DL transmission may also be scheduled for transmission in a same component carrier. The first DL transmission and the second DL transmission may be received on two different antenna panels.

A base station may schedule the UE for a first UL transmission included in a first UL transmission group associated with a half-duplex mode and a second UL transmission included in a second UL transmission group associated with a full-duplex mode, determine a higher priority UL transmission between a first UL transmission associated with a half-duplex mode and a second UL transmission associated with a full-duplex mode, and monitor for the first UL transmission and the second UL transmission using a beam of the higher priority UL transmission.

The priorities of the first UL transmission and the second UL transmission may be determined based on duplex modes of the first transmission group and the second transmission group. The priorities of the first UL transmission and the second transmission may be determined further based on content of the first UL transmission and the second UL transmission, the contents including one of a PUCCH, a SRS, a PUSCH, or a PRACH.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of a UE. The method includes receiving, from a base station, scheduling information for a first DL transmission associated with half-duplex mode and a second DL transmission associated with full duplex mode, determining priorities of the first DL transmission and the second DL transmission, and monitoring for a higher priority DL transmission among the first DL transmission and the second DL transmission.

Aspect 2 is the method of aspect 1, where the priorities of the first DL transmission and the second DL transmission is determined based on duplex modes of the first transmission group and the second transmission group.

Aspect 3 is the method of aspect 2, further including prioritizing a search for the first DL transmission of the first transmission group associated with the half-duplex mode over the search for the second DL transmission of the second transmission group associated with the full duplex mode.

Aspect 4 is the method of aspect 2, further including prioritizing a search for the second DL transmission of the second transmission group associated with the full duplex mode over the search for the first DL transmission of the first transmission group associated with the half-duplex mode.

Aspect 5 is the method of any of aspects 1 to 4, where the priorities of the first DL transmission and the second transmission is determined further based on content of the first DL transmission and the second DL transmission, the contents including one of a CORESET for a PDCCH, a CSI-RS, a PDSCH, or a SSB.

Aspect 6 is the method of any of aspects 1 to 5, further including receiving a configuration for multiple CORESETs within the first transmission group or the second transmission group, and monitor for a CORESET, from the multiple CORESETs, corresponding to a CSS set or a UE USS set having a lowest index in a cell with a lowest index containing CSS if the UE is configured.

Aspect 7 is the method of any of aspects 1 to 6, where the first DL transmission and the second DL transmission is scheduled for transmission in different component carriers.

Aspect 8 is the method of any of aspects 1 to 6, where the first DL transmission and the second DL transmission is scheduled for transmission in a same component carrier.

Aspect 9 is the method of any of aspects 1 to 8, further comprising determining a duplex mode of the first DL transmission and the DL second transmission based on a TCI state associated with the first DL transmission and the second DL transmission.

Aspect 10 is the method of aspect 9, where the UE determines the second DL transmission to be associated with the full duplex mode based on the TCI state indicating a bi-directional RS pair, and where the UE determines the first DL transmission to be associated with the half-duplex mode based on the TCI state indicating a single directional RS.

Aspect 11 is the method of any of aspects 1 to 8, further including determining that the first DL transmission or the second DL transmission of a SSB is in the full duplex mode based on at least one of the first DL transmission or the second DL transmission being the SSB and the SSB being transmitted simultaneously with an UL transmission or in the half duplex mode based on an SSB pattern or an SSB sequence.

Aspect 12 is the method of any of aspects 1 to 8, further including determining a duplex mode of the first DL transmission or the second DL transmission based on an indication of the duplex mode in a configuration of the first DL transmission or the second DL transmission.

Aspect 13 is the method of aspect 12, where the indication includes one or more bit included in one of an RRC configuration for CORESET and CSI-RS, or DCI for PDSCH.

Aspect 14 is the method of aspect 12, where the indication is included in an SSB transmission configuration of the first DL transmission or the second DL transmission.

Aspect 15 is the method of any of aspects 1 to 14, where the first DL transmission and the second DL transmission is received on two different antenna panels.

Aspect 16 is an apparatus for wireless communication including at least one processor coupled to a memory and configured to implement a method as in any of aspects 1 to 15.

Aspect 17 is an apparatus for wireless communication including means for implementing a method as in any of aspects 1 to 15.

Aspect 18 is a computer-readable medium storing computer executable code, where the code when executed by a processor causes the processor to implement a method as in any of aspects 1 to 15.

Aspect 19 is a method of UE. The method includes determining a higher priority UL transmission between a first UL transmission associated with a half-duplex mode and a second UL transmission associated with a full-duplex mode, and transmitting the first UL transmission and the second UL transmission simultaneously using a beam of the higher priority UL transmission.

Aspect 20 is the method of aspect 19, where the UE transmits the first UL transmission and the second UL transmission simultaneously in different component carriers.

Aspect 21 is the method of aspect 19, where the UE transmits the first UL transmission and the second UL transmission simultaneously in a same component carrier.

Aspect 22 is the method of any of aspects 19 to 21, where the UE transmits the first UL transmission and the second UL transmission on two different antenna panels.

Aspect 23 is the method of any of aspects 19 to 22, where the UE determines the higher priority UL transmission based on one or more of a duplex mode or content of the first UL transmission and the second UL transmission.

Aspect 24 is the method of aspect 23, further including determining the duplex mode of the first UL transmission or the second UL transmission based on an UL TCI state or spatial relation information of a respective transmission.

Aspect 25 is the method of aspect 24, where the UE determines the second UL transmission to be associated with the full duplex mode based on the TCI state indicating a bi-directional RS pair, and the UE determines the first UL transmission to be associated with the half-duplex mode based on the TCI state or the spatial relation information indicating a single directional RS.

Aspect 26 is the method of any of aspects 23, further including determining the duplex mode of the first UL transmission or the second UL transmission based on an indication in a configuration for a respective UL transmission.

Aspect 27 is the method of any of aspects 26, where the indication includes one or more bit in one of an RRC configuration or DCI for the respective UL transmission.

Aspect 28 is the method of any of aspects 19 to 23, further including using a first preamble from a half-duplex preamble group to transmit a random access channel for the first UL transmission or using a second preamble from a full duplex preamble group to transmit the random access channel for the second UL transmission.

Aspect 29 is an apparatus for wireless communication including at least one processor coupled to a memory and configured to implement a method as in any of aspects 19 to 28.

Aspect 30 is an apparatus for wireless communication including means for implementing a method as in any of aspects 19 to 28.

Aspect 31 is a computer-readable medium storing computer executable code, where the code when executed by a processor causes the processor to implement a method as in any of aspects 19 to 28.

Aspect 32 is the method of a base station. The method includes scheduling a user equipment (UE) for a first uplink (UL) transmission included in a first UL transmission group associated with a half-duplex mode and a second UL transmission included in a second UL transmission group associated with a full-duplex mode, determining a higher priority UL transmission between a first UL transmission associated with a half-duplex mode and a second UL transmission associated with a full-duplex mode, and monitoring for the first UL transmission and the second UL transmission using a beam of the higher priority UL transmission.

Aspect 33 is the method of aspect 32, where the priorities of the first UL transmission and the second UL transmission is determined based on duplex modes of the first transmission group and the second transmission group.

Aspect 34 is the method of aspect 33, further including prioritizing a search for the first UL transmission of the first transmission group associated with the half-duplex mode over the search for the second UL transmission of the second transmission group associated with the full duplex mode.

Aspect 35 is the method of aspect 33, further including prioritizing a search for the second UL transmission of the second transmission group associated with the full duplex mode over the search for the first UL transmission of the first transmission group associated with the half-duplex mode.

Aspect 36 is the method of any of aspects 32 to 35, where the priorities of the first UL transmission and the second transmission is determined further based on content of the first UL transmission and the second UL transmission, the contents including one of a PUCCH, an SRS, a PUSCH, or a PRACH.

Aspect 37 is the method of any of aspects 32 to 36, where the first UL transmission and the second UL transmission are scheduled for transmission in different component carriers.

Aspect 38 is the method of any of aspects 32 to 36, where the first UL transmission and the second UL transmission are scheduled for transmission in a same component carrier.

Aspect 39 is the method of aspect 32, further including determining a duplex mode of the first UL transmission and the second UL transmission based on a TCI states associated with the first UL transmission and the second UL transmission.

Aspect 40 is the method of aspect 39, where the base station determines the second UL transmission to be associated with the full duplex mode based on the TCI state indicating a bi-directional RS pair, and where the base station determines the first UL transmission to be associated with the half-duplex mode based on the TCI state indicating a single directional RS.

Aspect 41 is the method of aspect 32, further including determining a duplex mode of the first UL transmission or the second UL transmission based on an indication of the duplex mode in a configuration of the first UL transmission or the second UL transmission.

Aspect 42 is the method of aspect 41, where the indication includes one or more bit included in one of an RRC configuration for PUCCH and SRS, or DCI for PUSCH.

Aspect 43 is the method of aspect 42, further including determining a duplex mode of the first transmission group or the second transmission group based on PRACH preambles of the first UL transmission or the second UL transmission.

Aspect 44 is an apparatus for wireless communication including at least one processor coupled to a memory and configured to implement a method as in any of aspects 32 to 43.

Aspect 45 is an apparatus for wireless communication including means for implementing a method as in any of aspects 32 to 43.

Aspect 46 is a computer-readable medium storing computer executable code, where the code when executed by a processor causes the processor to implement a method as in any of aspects 32 to 43.

What is claimed is:

1. A method of wireless communication at a user equipment (UE), comprising:
   receiving, from a base station, scheduling information for a first downlink (DL) transmission comprised in a first transmission group associated with a half-duplex mode and a second DL transmission comprised in a second transmission group associated with a full-duplex mode;
   determining priorities of the first DL transmission and the second DL transmission based on the first transmission group and the second transmission group associated with the first DL transmission and the second DL transmission, wherein the priorities of the first DL transmission and the second DL transmission are determined based on duplex modes of the first transmission group and the second transmission group; and
   monitoring for a higher priority DL transmission among the first DL transmission and the second DL transmission.

2. The method of claim 1, further comprising:
   prioritizing a search for the first DL transmission of the first transmission group associated with the half-duplex mode over the search for the second DL transmission of the second transmission group associated with the full-duplex mode.

3. The method of claim 1, further comprising:
   prioritizing a search for the second DL transmission of the second transmission group associated with the full-duplex mode over the search for the first DL transmission of the first transmission group associated with the half-duplex mode.

4. The method of claim 1, wherein the priorities of the first DL transmission and the second DL transmission is determined further based on content of the first DL transmission and the second DL transmission, the content including one of a control resource set (CORESET) for a physical downlink control channel (PDCCH), a channel status information (CSI) reference transmission (RS) (CSI-RS), a physical downlink shared channel (PDSCH), or a synchronization transmission block (SSB).

5. The method of claim 1, further comprising:
   receiving a configuration for multiple control resource sets (CORESETs) within the first transmission group or the second transmission group; and
   monitoring for a CORESET, from the multiple CORESETs, corresponding to a common search space (CS S) set or a UE specific search space (US S) set having a lowest index in a cell with a lowest index containing CSS if the UE is configured.

6. The method of claim 1, further comprising:
   determining a duplex mode of the first DL transmission and the second DL transmission based on a transmission configuration indication (TCI) state associated with the first DL transmission and the second DL transmission.

7. The method of claim 6,
   wherein the UE determines the second DL transmission to be associated with the full-duplex mode based on the TCI state indicating a bi-directional reference signal (RS) pair, and
   wherein the UE determines the first DL transmission to be associated with the half-duplex mode based on the TCI state indicating a single directional RS.

8. The method of claim 1, further comprising:
   determining that the first DL transmission or the second DL transmission of a synchronization transmission block (SSB) is in the full-duplex mode based on at least one of the first DL transmission or the second DL transmission being the SSB and the SSB being transmitted simultaneously with an uplink (UL) transmission or in the half-duplex mode based on an SSB pattern or an SSB sequence.

9. The method of claim 1, further comprising:
   determining a duplex mode of the first DL transmission or the second DL transmission based on an indication of the duplex mode in a configuration of the first DL transmission or the second DL transmission.

10. The method of claim 9, wherein the indication comprises one or more bit comprised in one of a radio resource control (RRC) configuration for control resource set (CORESET) and channel status information (CSI) reference transmission (RS) (CSI-RS), or downlink control information (DCI) for physical downlink shared channel (PDSCH).

11. The method of claim 9, wherein the indication is comprised in a synchronization transmission block (SSB) transmission configuration of the first DL transmission or the second DL transmission.

12. A method of wireless communication at a user equipment (UE), comprising:
   determining a higher priority uplink (UL) transmission between a first UL transmission associated with a half-duplex mode and a second UL transmission associated with a full-duplex mode; and
   transmitting the first UL transmission and the second UL transmission simultaneously using a beam of the higher priority UL transmission.

13. The method of claim 12, wherein the UE determines the higher priority UL transmission based on one or more of a duplex mode or content of the first UL transmission and the second UL transmission.

14. The method of claim 13, further comprising:
   determining the duplex mode of the first UL transmission or the second UL transmission based on an UL transmission configuration indication (TCI) state or spatial relation information of a respective transmission.

15. The method of claim 14, wherein the UE determines the second UL transmission to be associated with the full-duplex mode based on the TCI state indicating a bi-directional RS pair, and the UE determines the first UL transmission to be associated with the half-duplex mode based on the TCI state or the spatial relation information indicating a single directional RS.

16. The method of claim 13, further comprising:
determining the duplex mode of the first UL transmission or the second UL transmission based on an indication in a configuration for a respective UL transmission.

17. The method of claim 16, wherein the indication comprises one or more bit in one of a radio resource control (RRC) configuration or downlink control information (DCI) for the respective UL transmission.

18. The method of claim 12, further comprising:
using a first preamble from a half-duplex preamble group to transmit a random access channel for the first UL transmission or using a second preamble from a full-duplex preamble group to transmit the random access channel for the second UL transmission.

19. A method of wireless communication of a base station, comprising:
scheduling a user equipment (UE) for a first uplink (UL) transmission comprised in a first UL transmission group associated with a half-duplex mode and a second UL transmission comprised in a second UL transmission group associated with a full-duplex mode;
determining a higher priority UL transmission between the first UL transmission associated with the half-duplex mode and the second UL transmission associated with the full-duplex mode; and
monitoring for the first UL transmission and the second UL transmission using a beam of the higher priority UL transmission.

20. The method of claim 19, wherein priorities of the first UL transmission and the second UL transmission are determined based on duplex modes of the first UL transmission group and the second UL transmission group.

21. The method of claim 20, further comprising:
prioritizing a search for the first UL transmission of the first UL transmission group associated with the half-duplex mode over the search for the second UL transmission of the second UL transmission group associated with the full-duplex mode.

22. The method of claim 20, further comprising:
prioritizing a search for the second UL transmission of the second transmission group associated with the full-duplex mode over the search for the first UL transmission of the first transmission group associated with the half-duplex mode.

23. The method of claim 19, wherein priorities of the first UL transmission and the second UL transmission is determined further based on content of the first UL transmission and the second UL transmission, the content including one of a physical uplink control channel (PUCCH), a sounding reference transmission (SRS), a physical uplink shared channel (PUSCH), or a physical random access channel (PRACH).

24. The method of claim 19, further comprising:
determining a duplex mode of the first UL transmission and the second UL transmission based on a transmission configuration indication (TCI) states associated with the first UL transmission and the second UL transmission.

25. The method of claim 24, wherein the base station determines the second UL transmission to be associated with the full-duplex mode based on the TCI state indicating a bi-directional reference signal (RS) pair, and
wherein the base station determines the first UL transmission to be associated with the half-duplex mode based on the TCI state indicating a single directional RS.

26. The method of claim 19, further comprising:
determining a duplex mode of the first UL transmission or the second UL transmission based on an indication of the duplex mode in a configuration of the first UL transmission or the second UL transmission.

27. The method of claim 26, wherein the indication comprises one or more bit comprised in one of a radio resource control (RRC) configuration for physical uplink control channel (PUCCH) and sounding reference transmission (SRS), or downlink control information (DCI) for physical uplink shared channel (PUSCH).

28. The method of claim 19, further comprising:
determining a duplex mode of the first UL transmission group or the second UL transmission group based on physical random access channel (PRACH) preambles of the first UL transmission or the second UL transmission.

* * * * *